(12) United States Patent
Zankat et al.

(10) Patent No.: US 11,127,087 B1
(45) Date of Patent: *Sep. 21, 2021

(54) INSURANCE CLAIM SUBMISSION USING CAPTURED IMAGES AND OPTICAL CHARACTER RECOGNITION (OCR)

(71) Applicant: STATE FARM MUTUAL AUTOMOBILE INSURANCE COMPANY, Bloomington, IL (US)

(72) Inventors: Siddharth Hamirsinh Zankat, Bloomington, IL (US); Kyle Joseph Bluth, Bloomington, IL (US); Erica Roehm, Bloomington, IL (US); Derek J. Lawless, Bloomington, IL (US); Matthew V. Ress, Bloomington, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/984,583

(22) Filed: Aug. 4, 2020

Related U.S. Application Data

(63) Continuation of application No. 14/816,315, filed on Aug. 3, 2015, now Pat. No. 10,803,527.

(60) Provisional application No. 62/164,066, filed on May 20, 2015, provisional application No. 62/046,653, filed on Sep. 5, 2014, provisional application No. 62/045,890, filed on Sep. 4, 2014.

(51) Int. Cl.
*G06Q 40/00* (2012.01)
*G06Q 40/08* (2012.01)
*H04W 4/60* (2018.01)
*G06K 9/18* (2006.01)
*G06K 9/00* (2006.01)

(52) U.S. Cl.
CPC ......... *G06Q 40/08* (2013.01); *G06K 9/00832* (2013.01); *G06K 9/18* (2013.01); *H04W 4/60* (2018.02)

(58) Field of Classification Search
CPC .................................................. G06Q 40/08
See application file for complete search history.

(56) References Cited

U.S. PATENT DOCUMENTS

| | | | |
|---|---|---|---|
| 9,147,119 B2 * | 9/2015 | Prakash | H04N 5/44 |
| 2014/0244317 A1 * | 8/2014 | Roberts | G06Q 40/08 |
| | | | 705/4 |
| 2015/0172894 A1 * | 6/2015 | Gabel | H04W 4/90 |
| | | | 455/404.2 |

* cited by examiner

*Primary Examiner* — Edward Chang
(74) *Attorney, Agent, or Firm* — Marshall, Gerstein & Borun LLP

(57) ABSTRACT

Methods, systems, apparatus, and non-transitory media are described for submitting an insurance claim. The described techniques include receiving one or more forms (and/or remote electronic access to such) from an external computing device to facilitate filing of an insurance claim associated with a vehicular accident. The forms may include one or more data fields corresponding to data used to process an insurance claim. To fill in the insurance form data, the mobile computing device may capture of one or more images associated with the vehicular accident. One or more object recognition and/or optical character recognition (OCR) processes may be applied to the one or more images to extract image data, which may be used to populate one or more insurance claim form fields. Once completed, the insurance claim form may be sent to an insurer from the mobile computing device to facilitate submission of the insurance claim.

20 Claims, 12 Drawing Sheets

Save            Occupant              Delete

📷 Take a photo of the driver's license or
   state ID to fill in occupant info.           ›

First name           [                    ]
Last name            [      required      ]
Phone                [                    ]
Address              [                    ]
City                 [                    ]
State/Province       [                    ]
ZIP/Postal code      [                    ]
Role                 [      required      ]
Injured

Cancel      Select State Province

Please select the state or province in which
the driver's license or state ID has been issued Alabama                                    A
                                           B
Alaska                                     C
                                           D
Arizona                                    F
                                           G
California                                 H–K
                                           L
Colorado                                   M
                                           N
Connecticut                                O
                                           P
Delaware                                   Q
                                           R
                                           S
                                           T
                                           U
                                           V
                                           W
                                           Y

INSURANCE CLAIM SUBMISSION USING CAPTURED IMAGES AND OPTICAL CHARACTER RECOGNITION (OCR)

CROSS-REFERENCE TO RELATED APPLICATIONS

This application claims the benefit of U.S. patent application Ser. No. 14/816,315 entitled "Insurance Claim Submission Using Captured Images and Optical Character Recognition (OCR)," filed on Aug. 3, 2015, U.S. Provisional Patent Application No. 62/045,890 entitled "Method of Automated Capture of Image Data for an Insurance Claim," filed on Sep. 4, 2014, U.S. Patent Application No. 62/046,653 entitled "Method of Automated Capture of Image Data for an Insurance Claim," filed on Sep. 5, 2014, and U.S. Patent Application No. 62/164,066 entitled "Insurance Claim Submission Using Captured Images and Optical Character Recognition (OCR)," filed on May 20, 2015, the disclosure of each of which is hereby incorporated by reference in its entirety.

TECHNICAL FIELD

The present disclosure relates generally to methods, apparatus, systems, and non-transitory computer-readable media used to submit an insurance claim, and more particularly, to automatically populating insurance claim forms, and/or submitting and/or processing insurance claims using data extracted from one or more captured images.

BACKGROUND

Conventional techniques for submitting insurance claims have several issues. First, manually filled insurance claim forms may include erroneous or incomplete data due to human error. Second, manually filling out insurance forms is inconvenient, inefficient, and time consuming. As a result, forms submitted to an insurer by policyholders may take a long time to fill out, and/or may include inaccurate data, resulting in processing delays and/or incorrect claim settlements. The present aspects described herein may overcome these and/or other deficiencies.

BRIEF SUMMARY

The present embodiments may relate to populating one or more fields of an insurance claim form using one or more images captured via a mobile computing device. The captured images may be associated with the vehicular accident, such as vehicles involved, vehicle occupants, and/or witnesses to the accident. Once completed, the insurance claim form may be sent to an insurance provider via a communication network to facilitate the submission and/or processing of an insurance claim.

In one aspect, a computer-implemented method for populating an insurance claim form may be provided. A method may include (1) receiving an input via a mobile computing device indicating that an insurance claim corresponding to a vehicular accident is to be submitted to an insurance provider; (2) displaying an insurance claim form via the mobile computing device corresponding to the insurance claim; (3) capturing one or more images associated with the vehicular accident; (4) receiving image data from the one or more images; (5) populating one or more fields of the insurance claim form with populated data based upon the image data; and/or (6) transmitting the insurance claim form including the populated data to an external computing device. The insurance claim form may be received by the external computing device and utilized to facilitate filing of the insurance claim associated with the vehicular accident. The method may include additional, fewer, or alternate actions, including those discussed elsewhere herein.

In another aspect, a tangible computer-readable medium storing machine readable instructions in mobile computing device is described, that when executed by a processor, causes the processor to (1) receive an input via a mobile computing device indicating that an insurance claim corresponding to a vehicular accident is to be submitted to an insurance provider; (2) display an insurance claim form via the mobile computing device corresponding to the insurance claim; (3) capture one or more images associated with the vehicular accident; (4) receive image data from the one or more images; (5) populate one or more fields of the insurance claim form with populated data based upon the image data; and/or (6) transmit the insurance claim form including the populated data to an external computing device. The insurance claim form may be received by the external computing device and utilized to facilitate filing of the insurance claim associated with the vehicular accident.

In yet another aspect, a mobile device is described that may include (i) a communication unit configured to receive an input indicating that an insurance claim corresponding to a vehicular accident is to be submitted to an insurance provider, (ii) a display configured to display an insurance claim form via the mobile computing device corresponding to the insurance claim, (iii) an image capture device configured to capture one or more images associated with the vehicular accident, and/or (iv) a processor configured to receive image data from the one or more images and to populate one or more fields of the insurance claim form with populated data based upon the image data. The communication unit may be further configured to transmit the insurance claim form including the populated data to an external computing device. The insurance claim form may be received by the external computing device and utilized to facilitate filing of the insurance claim associated with the vehicular accident.

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF THE DRAWINGS

The figures described below depict various aspects of the systems and methods disclosed herein. It should be understood that each figure depicts an aspect of a particular aspect of the disclosed system and methods, and that each of the figures is intended to accord with a possible aspect thereof. There are shown in the drawings arrangements which are presently discussed, it being understood, however, that the present embodiments are not limited to the precise arrangements and instrumentalities shown, wherein:

FIG. 6A illustrates an exemplary screenshot 600 that may be displayed on a mobile computing device to enable the collection of insurance form data for an occupant of a vehicle involved in an accident;

FIG. 6B illustrates an exemplary screenshot 620 that may be displayed on a mobile computing device upon a user selecting the option to take a photo of a driver's license or state ID;

The Figures depict aspects of the present disclosure for purposes of illustration. One skilled in the art will readily recognize from the following discussion that alternate aspects of the structures and methods illustrated herein may be employed without departing from the principles of the invention described herein.

DETAILED DESCRIPTION

The present embodiments may relate to, inter alia, reporting a vehicular accident and/or submitting online or insurance claims, such as via a mobile device. A mobile computing device may execute one or more algorithms, applications, programs, routines, etc., to facilitate communication with one or more external computing devices and/or to facilitate user interaction with the mobile computing device.

The mobile computing device may communicate with one or more external computing devices to send an indication that a claim is to be submitted corresponding to a vehicular accident. In response to this indication, the one or more external computing devices may transmit one or more insurance claim forms to the mobile computing device and/or cause the mobile computing device to prompt a user to take one or more images associated with the vehicular accident, such as vehicles, occupants, and/or witnesses, for example.

In some aspects, the external computing device and/or the mobile computing device may perform a validation on the one or more captured images. This validation may include, for example, a determination of whether the quality of the one or more images is sufficient for data to be extracted from the one or more images or whether the one or more images may be otherwise processed.

Once image validation is successful, the external computing device and/or the mobile computing device may extract image data from the one or more images to populate one or more fields of the insurance claim form using object recognition and/or OCR. Once the insurance claim fields have been completely filled (either via manual entry or population using extracted image data), the completed insurance claim form may be sent to one or more external computing devices to facilitate submission of the corresponding insurance claim.

An Exemplary Mobile Data Capture System

Figure 1:
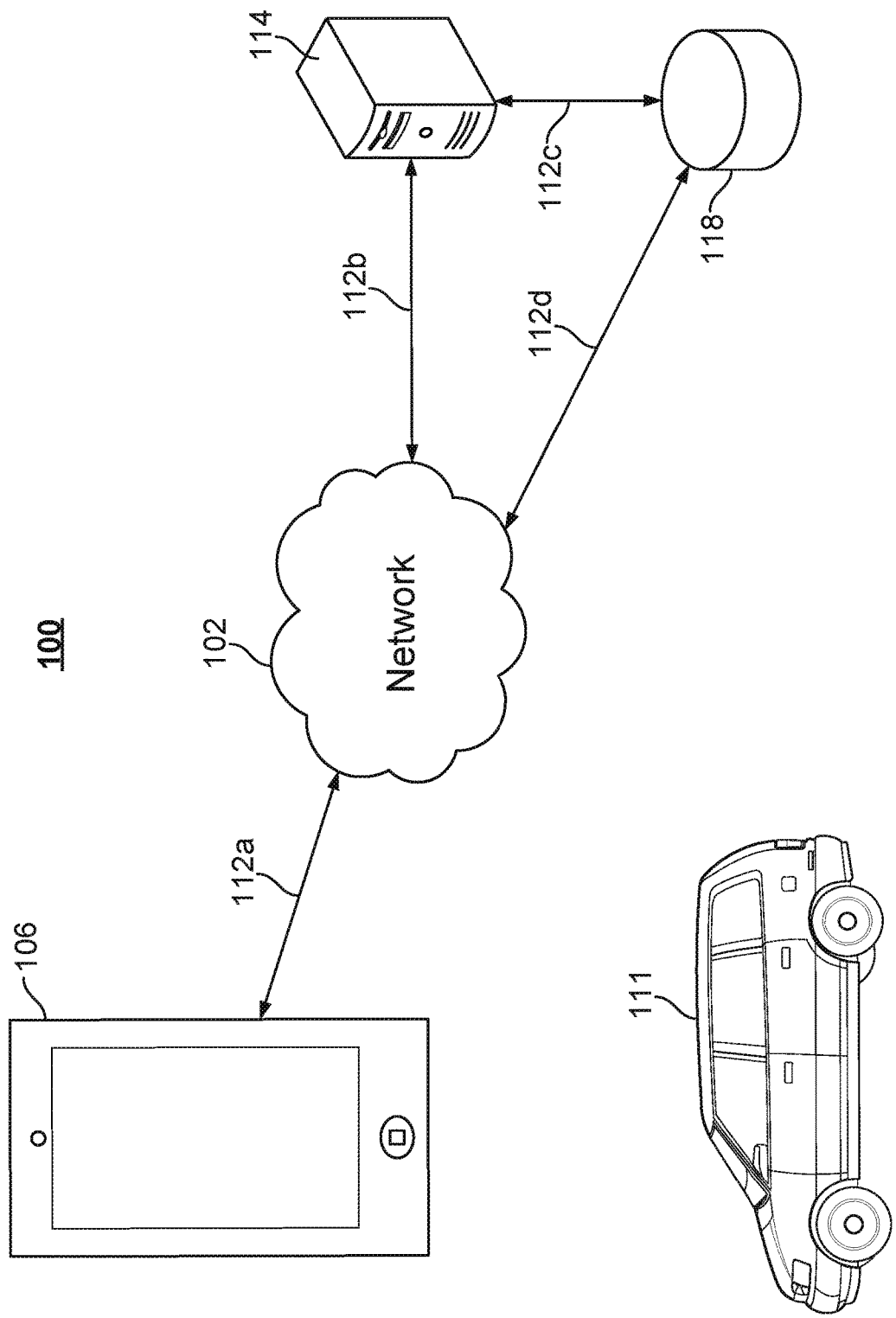
FIG. 1 illustrates a block diagram of an exemplary mobile data capture system 100.

FIG. 1 illustrates a block diagram of an exemplary mobile data capture system 100. Mobile data capture system 100 may include hardware and/or software applications, as well as various data communication channels for facilitating data communications between the various hardware and software components.

In one aspect, mobile data capture system 100 may include a network 102, a mobile computing device 106, a vehicle 111, an external computing device 114, and/or a storage device 118. Although FIG. 1 illustrates vehicle 111 as an automobile, various aspects include vehicle 111 being any suitable type of vehicle, such as an automobile, a watercraft, a motorcycle, etc. Mobile data capture system 100 may include additional, fewer, or alternate components, including those discussed elsewhere herein.

In the present aspect, network 102 may be configured as any suitable network to facilitate communications between mobile computing device 106 and external computing device 114. Network 102 may include any appropriate combination of wired and/or wireless communication networks to facilitate this functionality. For example, network 102 may include one or more telecommunication networks and may constitute (i) nodes and/or (ii) links 112a-d used for data and/or communication exchange between various nodes.

To provide additional examples, network 102 may include a wireless telephony network (e.g., GSM, CDME, LTE, etc.), a Wi-Fi network (e.g., based on 802.11x standards) a BLUETOOTH network, one or more proprietary networks, one or more base stations, access points, cellular networks, a secure public internet, a mobile-based network, a virtual private network or some other type of network, such as dedicated access lines, plain ordinary telephone lines, satellite links, a public switched telephone network (PSTN), etc., or any suitable combination thereof.

Network 102 may facilitate a connection to the Internet for mobile computing device 106, external computing device 114, and/or storage device 118. Additional connections to facilitate a connection to the Internet are not shown in FIG. 1 for purposes of brevity.

Mobile computing device 106 may be configured to communicate with network 102 via any number of wired and/or wireless links, such as link 112*a*, for example, via one or more suitable communication protocols. For example, mobile computing device 106 may communicate with external computing device 114 via a cellular communication protocol using network 102 and links 112*a-b*.

Mobile computing device 106 may be implemented as any suitable type of computing or mobile device configured to perform the various functions of the aspects as described herein, such as a smartphone, a tablet computer, a laptop computer, a wearable computing device, smart watch, smart glasses, PDA (personal data assistant), or any suitable type of mobile computing device. Mobile computing device 106 may be implemented as one or more computing devices configured to execute one or more algorithms, program applications, etc., to facilitate one or more aspects of the disclosure as described herein.

For example, mobile computing device 106 may be configured to send an indication to external computing device 114 that an insurance claim is to be submitted, to receive the one or more insurance forms corresponding to the insurance claim, to capture the one or more images associated with the accident, to perform object recognition and/or optical character recognition (OCR) on the one or more images locally, to transmit the one or more images associated with the accident to external computing device 114 so that external computing device 114 may perform object recognition and/or OCR on the one or more images, to extract image data (or receive extracted data from external computing device 114) as a result of the object recognition and/or OCR (e.g., one or more alphanumeric characters), to populate one or more fields of the insurance form with the extracted image data, and/or to transmit the completed insurance claim form field data to external computing device 114.

In some aspects, mobile computing device 106 may be configured to receive one or more notifications transmitted from external computing device 114 upon sending the initial indication that an insurance claim form is being submitted. These notifications may cause mobile computing device 106 to display a prompt a user (e.g., an insurance policy holder associated with vehicle 111) to take further action to complete the insurance claim process using mobile computing device 106.

In accordance with such aspects, external computing device 114 may notify a user that mobile computing device 106 may be used to capture one or more images associated with the vehicular accident, and that the data extracted from these images may be used to fill in insurance claim form fields as opposed to a user typing them in manually. As further discussed below, these notifications may be transmitted by external computing device 114 in accordance with any suitable number and type of conditions being satisfied.

In one aspect, mobile computing device 106 may be configured to add application data to an image that was captured via a camera associated with mobile computing device 106. In some aspects, the application data may be added to the one or more images as metadata. In other aspects, the application data may be sent as part of a separate data communication.

The application data may include, for example, any suitable type of data to facilitate the association of the insurance claim form data with a corresponding insured person, such as logon credentials, policy holder information, an insurance policy number, a user id, contact information or other suitable identifying information, device information, the current date, time, information regarding the environment, the weather conditions, geographic location, etc. Mobile computing device 106 may be configured to add application data to the one or more images prior to storing the one or more images on mobile computing device 106 and/or prior to sending the one or more images to external computing device 114. Mobile computing device 106 may be configured to store application data and/or one or more captured images locally in a suitable memory utilized by mobile computing device 106.

In some aspects, mobile computing device 106 may perform any suitable number and/or type of object and/or optical character recognition (OCR) processes locally on one or more stored images on mobile computing device 106. For example, mobile computing device 106 may extract image data from an image by performing one or more object recognition and/or OCR processes on one or more stored images. Continuing this example, execution of the object and/or OCR algorithms may result in image data being extracted from the one or more images and used to populate one or more insurance form fields that would otherwise be manually input into the insurance claim form.

In other aspects, mobile computing device 106 may offload the image data extraction to external computing device 114. For example, mobile computing device 106 may send one or more images associated with the accident (e.g., an image of vehicle 111, an image of a driver's license of a driver, passenger, and/or a witnesses involved in the accident, etc.) to external computing device 114. External computing device 114 may receive the one or more images and perform any suitable number and/or type of object and/or OCR processes on the one or more images to extract image data relevant to the insurance claim process from the one or more images and transmit the extracted image data to mobile computing device 106.

Regardless of whether the image data extraction is performed locally at mobile computing device 106 or offloaded to external computing device 114, aspects include the extracted image data being based upon the type of image that is taken and/or what is included in each image. The type of image that is taken may be identified, for example, via a user interaction with a suitable application installed on mobile computing device 106, which is further discussed below with reference to FIGS. 4-6. For example, mobile computing device 106 may generate a flag, label, etc. (which may be included as part of the application data, as metadata added to one or more images, etc.) so that another computing device (e.g., external computing device 114) may identify this data once extracted such that the appropriate fields in the insurance form may be populated.

To provide an illustrative example, an image of the rear of vehicle 111 may result in extracted image data such as a make, model, and/or license plate number of vehicle 111. To provide another illustrative example, an image of a driver's license of a driver, passenger, or witness may result in extracted image data such as a name, contact information, a driver's license number, etc.

External computing device 114 may be implemented as any suitable type of device to facilitate the various functions in accordance with the aspects described herein. In some aspects, external computing device 114 may be configured to execute various suitable software applications, algorithms, routines, and/or programs to facilitate one or more functions associated with mobile data capture system 100 as described herein. For example, external computing device 114 may be implemented as a network server, a web-server, a database server, a file server, a personal computer, a laptop, a smartphone, other mobile device, or any suitable combination thereof.

Storage device 118 may be configured to store any suitable type of data utilized in to facilitate the various functions in accordance with the aspects described herein. For example, storage device 118 may be implemented as one or more databases, memory devices such as hard disks, optical disks, a cloud storage system, etc. In various aspects, storage device 118 may store data such as the aforementioned application data, insurance profile data, which may include insurer contact information, policy data, a history of claims, pending claims, claim status data, insurer contact information, etc.

External computing device 114 may be configured to communicate with mobile computing device 106 and/or storage device 118 via any suitable number and/or type of communication protocols, which may be the same communication protocols or different communication protocols. Communications between mobile computing device 106, external computing device 114, and/storage device 118 may result in any suitable type of data being transferred between any suitable combination of these devices, and may be implemented with any suitable number and/or type of wired and/or wireless links (e.g., links 112a-d).

External computing device 114 may be configured to download relevant policy holder information or other data facilitate the claim submission process from storage device 118. In some aspects, external computing device 114 may access data stored in storage device 118 utilizing link 112c. These types of aspects may be particularly useful, for example, when storage device 118 is part of an insurer infrastructure or otherwise holds secure data, whereby network or Internet access to storage device 118 may be limited or undesirable.

In other aspects, external computing device 114 may access data stored in storage device 118 utilizing network 102 (e.g., via links 112b and 112d). These types of aspects may be particularly useful, for example, when storage device 118 is part of a cloud-based storage infrastructure and/or utilizes appropriate secure protocols to secure Internet transmission of data stored in storage device 118.

In some aspects, external computing device 114 may be configured to perform any suitable portion of processing functions remotely that may be outsourced by mobile computing device 106. For example, mobile computing device 106 may capture one or more images and send the one or more images to external computing device 114 for remote object recognition and/or OCR processing instead of performing the processing locally at mobile computing device 106.

In various aspects, external computing device 114 may perform one or more actions to validate one or more images received via mobile computing device 106 and/or to validate one or more steps used in the claim submission process. For example, if the image quality, resolution, etc., of one or more images received via mobile computing device 106 are unsuitable for object recognition and/or OCR processing, then external computing device 114 may determine that the one or more images have failed validation and transit a notification indicating this to mobile computing device 106.

To provide another example, if a driver's license is issued by a state that currently may not allow automated data capture, then external computing device 114 may transmit a notification indicating this to mobile computing device 106.

In one aspect, external computing device 114 may send notifications to one or more computing devices, such as mobile computing device 106, for example, in accordance with any suitable type of format such as email messages, text messages, push notifications, a notification displayed within a relevant application executed by mobile computing device 106, etc., and may be based upon the device to which the notification is sent.

External computing device 114 may perform any combination of manual and automated functions. For example, external computing device 114 may be configured to facilitate object recognition processes, OCR processes, generate insurance forms, perform policy updating, send notifications, and/or accept input via a suitable user interface (e.g., keyboard, mouse, touchscreen, etc.) to facilitate manual review or other manual processes used throughout the claim submission process.

Although illustrated as single devices in FIG. 1, in various aspects, mobile computing device 106 and/or external computing device 114 may be implemented as any suitable number and/or type of computing devices. In accordance with such aspects, each computing device may include one or more CPUs and be configured to operate independently of the other computing devices. Computing devices operating as a group may process requests from other computing devices individually (e.g., based upon their availability) and/or concurrently (e.g., parallel processing). Computing devices operating as a group may process requests from other computing devices in a prioritized and/or distributed manner. For example, an operation associated with processing a request may be performed on one computing device while another operation associated with processing the same request (or a different request) is performed on another computing device.

Exemplary End-User/Destination Devices

Figure 2:
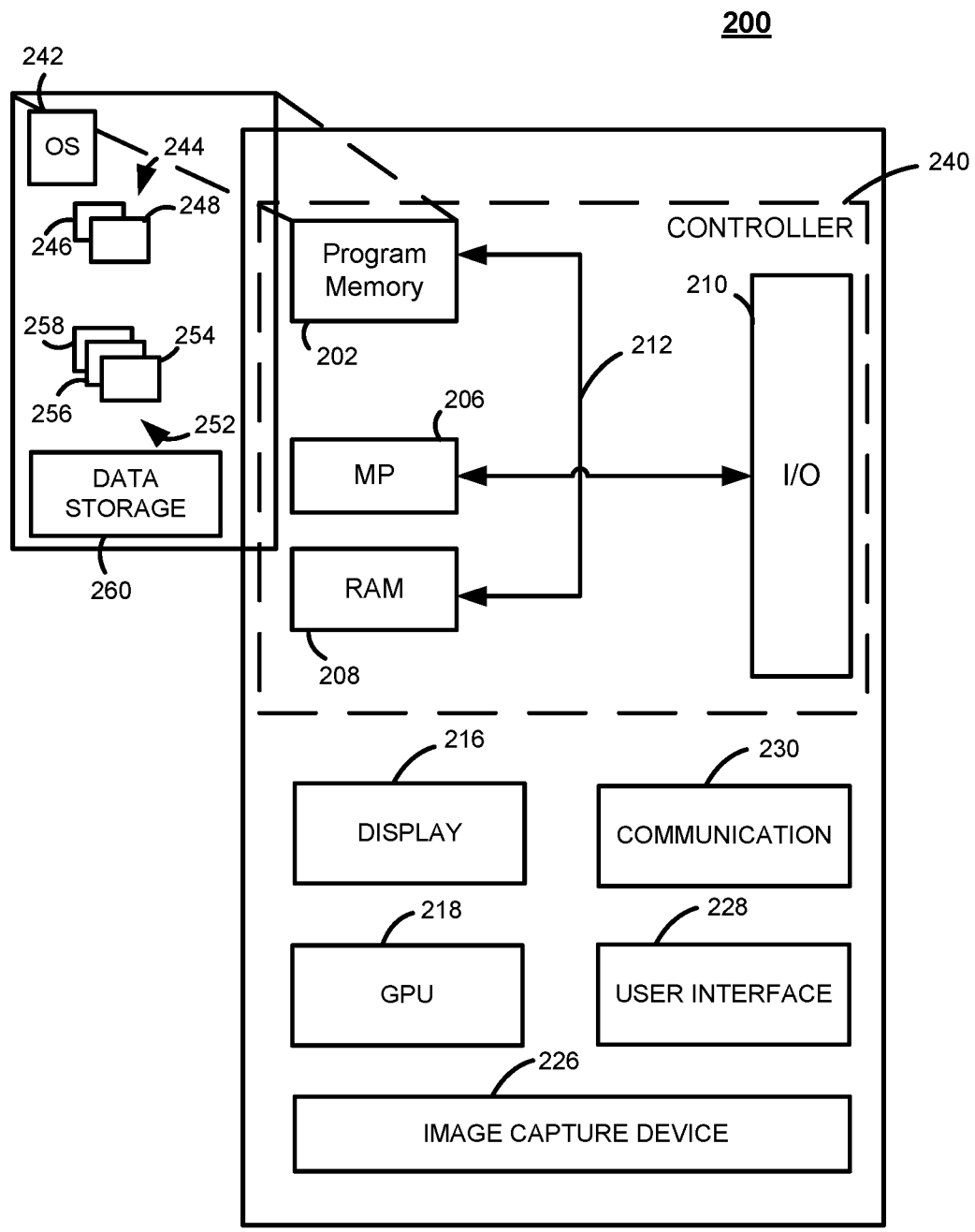
FIG. 2 illustrates a block diagram of an exemplary mobile computing device 200.

FIG. 2 illustrates a block diagram of an exemplary mobile computing device 200. In one aspect, mobile computing device 200 may be an implementation of mobile computing device 106, as shown in FIG. 1. Mobile computing device 200 may include a controller 240, a display 216, a communication unit 230, a graphics processing unit (GPU) 218, an image capture device 226, and/or a user interface 228.

Controller 240 may include a program memory 202, one or more of a microprocessor (MP) 206, a random-access memory (RAM) 208, and an input/output (I/O) interface 210, each of which may be interconnected via an address/data bus 212.

In various aspects, program memory 202 may be implemented as a non-transitory tangible computer readable media configured to store computer-readable instructions, that when executed by controller 240, cause controller 240 to perform various acts. For example, program memory 202 may include an operating system 242, one or more software applications 244, and/or one or more software routines 252. Program memory 202 may be configured to include other portions to store data that may be read from and written to by MP 206, such as data storage 260, for example.

In various aspects, program memory 202 and/or RAM 208 may be implemented as any suitable type of memory, such as non-transitory computer readable memories, semiconductor memories, magnetically readable memories, and/or optically readable memories, for example. MP 206 may be configured to execute one or more of operating system (OS) 242, software applications 244, software routines 252, and/or additional or alternative software applications to facilitate the various aspects described herein.

The operating system 242 may be implemented as any suitable operating system platform depending on the particular implementation of mobile computing device 200. For example, operating system 242 may be implemented as one of a plurality of mobile platforms such as the iOS®, Android™, Palm® webOS, Windows® Mobile/Phone, BlackBerry® OS, or Symbian® OS mobile technology platforms, developed by Apple Inc., Google Inc., Palm Inc. (now Hewlett-Packard Company), Microsoft Corporation, Research in Motion (RIM) or Blackberry, and Nokia, respectively.

Data storage 260 may store data used in conjunction with one or more functions performed by mobile computing device 200 to facilitate the interaction between mobile computing device 200 and one or more other devices, such as between mobile computing device 200 and one or more networks (e.g., network 102), vehicles (e.g., vehicle 111), one or more external computing devices (e.g., external computing device 114), etc. In some aspects, controller 240 may be configured to communicate with additional data storage mechanisms that are not shown in FIG. 2 for purposes of brevity (e.g., one or more hard disk drives, optical storage drives, solid state storage devices, external storage devices, etc.) that reside within or are otherwise associated with mobile computing device 200.

In one aspect, data storage 260 may store data such as software application data for the one or more software applications 244, routine data for the one or more software routines 252, other application data as previously discussed (e.g., policy profile information, user identification, a user password, user name, and/or a userid, vehicle identifications and/or personal identifications, etc.) one or more images associated with the vehicular accident (e.g., those captured by image capture device 226), one or more driver's license or state ID reference templates, etc.

Display 216 may be implemented as any suitable type of display and may facilitate user interaction with mobile computing device 200 in conjunction with user interface 228. For example, display 216 may be implemented as a capacitive touch screen display, a resistive touch screen display, etc. In various aspects, display 216 may be configured to work in conjunction with controller 240 and/or GPU 218 to display information in accordance with the various aspects described herein, such as instructions for taking one or more images associated with a vehicular accident, one or more insurance forms generated by mobile computing device 200 and/or received via an external computing device (e.g., external computing device 114), a confirmation that one or more images have been verified by mobile computing device 200 and/or by an external computing device (e.g., external computing device 114), a list of states for a user to select from to indicate which of the one or more driver's licenses have been issued, etc.

Image capture device 226 may be implemented as any suitable device configured to capture images and store these images in a suitable portion of program memory 202. For example, image capture device 226 may be implemented as a camera integrated as part of mobile computing device 200, a peripheral camera, a webcam, a camera installed inside a vehicle, a camera installed outside a vehicle, etc.

In aspects in which image capture device 226 is implemented as a device external to device 200, image capture device 226 may be configured to communicate with device 200, for example, to send captured images to device 200. In various aspects, image capture device 226 may use one or more orientations, cropping patterns, zoom levels, effects, etc., to capture one or more images associated with a vehicular accident, such as images of a vehicle (e.g., using a wide-angle view to photo rear of vehicle including a license plate) and/or images of persons involved, associated with, impacted by, and/or witnessing a vehicular accident.

Communication unit 230 may be configured as any suitable device to facilitate communications between mobile computing device 200 and one or more other devices (e.g., external computing device 114), as previously discussed above with reference to FIG. 1. In various aspects, communication unit 230 may be configured to support any suitable number and/or type of communication protocols based upon a particular network and/or device with which mobile communication device 200 is communicating.

For example, communication unit 230 may support communications in accordance with communication protocols such as cellular communication protocols (e.g., GSM, CDMA, LTE), communication protocols utilizing Wi-Fi 802.11 standards, WiMAX, near field communication (NFC) standards (e.g., ISO/IEC 18092, standards provided by the NFC Forum), BLUETOOTH communication protocols, etc.

In one aspect, communication unit 230 may be configured to support separate or concurrent communications, which may be the same type of communication protocol or different types of communication protocols. For example, communication unit 230 may be configured to facilitate communications between mobile computing device 200 and an external computing device (e.g., external computing device 114) via a cellular communications protocol while facilitating communications between mobile computing device 200 and a vehicle (e.g., vehicle 111) in accordance with a BLUETOOTH communication protocol.

In various aspects, communication unit 230 may be configured to transmit any suitable type of data to one or more external computing devices (e.g., external computing device 114). For example, communication unit 230 may transmit one or more portions of application data and/or metadata with the one or more images associated with a vehicular accident as separate (concurrent or subsequent) data transmissions.

To provide another example, communication unit 230 may transmit the one or more vehicle images associated with a vehicular accident having one or more portions of application data and/or metadata embedded or otherwise attached as part of one or more of the images. To provide still another example, communication unit 230 may transmit any suitable information included as part of answers to insurance form fields, such as insurance policy information, a policy number, a time and date stamp, a license plate number, contact information, vehicle information (e.g., a make, model, and year of the vehicle), user profile information (e.g., logon credentials, a user id), a state in which one or more drivers licenses are issued, etc.

In various aspects, the information that is included as part of answers to insurance form fields may be filled in by any suitable combination of manual entries (e.g., via user interaction with user interface 228) and/or by automated prefilling as a result of object recognition and/or OCR from one or more images associated with the vehicular accident, which is further discussed below.

In various aspects, communication unit 230 may be configured to receive any suitable type of data from one or more external computing devices (e.g., external computing device 114). For example, communication unit 230 may receive one or more insurance claim forms upon transmitting an indication that an insurance claim is to be submitted, which may be received by the external computing device.

To provide another example, communication unit 230 may receive any suitable number and type of notifications (e.g., email, text messages, push notifications, pop-up onscreen notification, etc.) from an external computing device such as one notifications indicating that submitted forms have been accepted, that a claim has been successfully submitted and/or opened, that image validation of one or more images associated with a vehicular accident has failed at the external computing device, that one or more images need to be retaken and/or retransmitted, etc.

In one aspect, one of the one or more software applications 244 may be a vehicle accident claim submission application 246, which may be implemented as a series of machine-readable instructions for performing the various tasks associated with executing one or more aspects described herein. Vehicle accident claim submission application 246 may cooperate with one or more other hardware or software portions of mobile computing device 200 to facilitate these functions.

For example, vehicle accident claim submission application 246 may work in conjunction with one or more of routines 252 and/or other software applications 244 to perform one or more functions of the aspects as described herein. Vehicle accident claim submission application 246 may include instructions for performing tasks such as, for example, receiving insurance form data from an external computing device (e.g., external computing device 114) via communication unit 230, displaying one or more insurance forms via display 216, displaying one or more notifications via display 216, displaying instructions to capture one or more images associated with a vehicular accident via display 216, displaying a virtual keyboard to facilitate the manual entry of insurance form fields via user interface 228 and display 216, transmitting one or more images associated with a vehicular accident to an external computing device via communication unit 230, populating one or more insurance claim form fields via display 216, displaying user and/or policy information, displaying a history of vehicle insurance claims via display 216, facilitating communications between mobile computing device 200 and one or more other devices in conjunction with communication unit 230, etc.

One of the one or more software applications 244 may be a web browser 248. In some aspects, web browser 248 may be a native web browser application, such as Apple's Safari®, Google Android™ mobile web browser, Microsoft Internet Explorer® for Mobile, Opera Mobile™, etc. In other aspects, web browser 248 may be implemented as an embedded web browser.

Regardless of the implementation of web browser 248, various aspects include web browser 248 being implemented as a series of machine-readable instructions that, when executed by MP 206, result in mobile computing device 200 receiving, interpreting, and/or displaying web page content from an external computing device (e.g., external computing device 114). This web page content may be utilized, for example, in conjunction with vehicle accident claim submission application 246 to perform one or more functions of the aspects as described herein.

In one aspect, one of the one or more software routines 252 may include a data read/write routine 254. Data read/write routine 254 may include instructions, that when executed by MP 206, cause MP 206 to collect, measure, sample, generate, and/or store various types of data used by vehicle accident claim submission application 246. Again, this data may be stored as part of the application data and/or metadata in any suitable portion of computing device 200 (e.g., in data storage 260 and/or RAM 208) and/or to an external computing device, which may be accessed by vehicle accident claim submission application 246 as needed.

To provide an illustrative example, data read/write routine 254 may include instructions that, when executed by MP 206 and/or GPU 218, causes MP 206 to store one or more captured images associated with a vehicular accident in a suitable portion of program memory 202 (e.g., data storage 260).

To provide another example, data read/write routine 254 may include instructions that, when executed by MP 206 and/or GPU 218, causes GPU 218 to receive one or more insurance forms from an external computing device, to store a user's answers to one or more insurance form fields, to store automatically populated answers via object recognition and/or OCR performed on the one or more captured images associated with a vehicular accident, etc. As further discussed below, execution of vehicle accident claim submission application 246 by MP 206 may cause data received and/or stored via execution of data read/write routine 254 to be transmitted to one or more external computing devices (e.g., external computing device 114).

Mobile computing device 200 may perform any suitable combination of local and offloaded processing to facilitate the various aspects as described herein. For example, in some aspects, mobile computing device 200 may offload one or more processing functions via communications with an external computing device, which is further discussed with reference to FIG. 3. But in other aspects, mobile computing device 200 may perform one or more processing functions (or the entirety of processing functions) locally.

In accordance with local processing aspects, mobile computing device 200 may include one or more object recognition and/or OCR routines 256. Object recognition and/or OCR routines 256 may include instructions that, when executed by controller 240, cause mobile computing device 200 to perform an object recognition and/or an OCR process on one or more captured images associated with a vehicular accident. In various embodiments, one or more object recognition and/or OCR routines 256 may include instructions to implement any suitable number and/or type of object recognition and/or OCR processes, which may be the same type of object recognition and/or OCR processes (e.g., to process multiple images simultaneously with the same applied OCR process) or different types of object recognition and/or OCR processes (e.g., to process one image using different types of OCR processes).

To provide an illustrative example, object recognition and/or OCR routines 256 may enable mobile computing device 200 to perform one or more OCR processes on an image of a driver's license to extract data from the image. Object recognition and/or OCR routines 256 may include instructions that, when executed by controller 240, cause controller 200 to access one or more driver's license or state ID reference templates to improve the efficiency of object recognition and/or OCR processes by matching a particular state selected by the user to the reference templates corresponding to the selected state. This process is further discussed below with reference to FIG. 6B.

In one aspect, this data may be utilized to prefill or prepopulate one or more insurance claim form fields, which may be verified by a user and edited if necessary. That is, if a user indicates via user interface 228 that occupant data is to be added to the insurance claim form, then the user may utilize mobile computing device 200 to capture an image of that occupant's driver's license. Upon performing one or more OCR processes on the image, the occupant's name, address, driver's license number, etc., may be extracted from the image as image data and used to prepopulate one or more insurance claim form fields associated with the occupant data.

To provide another illustrative example, object recognition and/or OCR routines 256 may enable mobile computing device 200 to perform one or more object recognition processes on an image of a vehicle to extract data from the image. This data may be utilized to prefill or prepopulate one or more insurance claim form fields. That is, if a user selects via user interface 228 a vehicle to include in the insurance claim form, then the user may utilize mobile computing device 200 to capture an image of the rear of the vehicle. Upon performing one or more object recognition and/or OCR processes on the vehicle image, the year, make, model, license plate number, etc., may be extracted from the image and used to prepopulate one or more insurance claim form fields associated with vehicle identification.

In one aspect, one of the one or more software routines 252 may include an image validation routine 258. Image validation routine may include instructions, that when executed by controller 240, cause mobile computing device 200 to validate one or more images associated with a vehicular accident and/or the image data extraction process.

For example, instructions stored in image validation routine 258 may specify a threshold resolution, contrast, brightness, and/or other suitable conditions placed upon the quality of the one or more captured images associated with a vehicular accident. If the one or more images fail one or more of these threshold conditions, vehicle accident claim submission application 246 may cause a notification to be displayed (e.g., via user interface 228) notifying a user to retake one or more images.

To provide another example, image validation routine 258 may include instructions that indicate that image data could not otherwise be extracted from one or more captured images, which may result in the notification being presented to a user to retake one or more images. This could occur, for example, when the image quality threshold conditions are met but other artifacts and/or lighting conditions prevent the object recognition and/or OCE processes from extracting the image data.

In some aspects, one or more of software applications 244 and/or software routines 252 may reside in program memory 202 as default applications that may be bundled together with the OS of mobile computing device 200. For example, web browser 248 may be part of software applications 244 that are included with OS 242 implemented by device 200.

In other aspects, one or more of software applications 244 and/or software routines 252 may be installed on mobile computing device 200 as one or more downloads, such as an executable package installation file downloaded from a suitable application store via a connection to the Internet. For example vehicle accident claim submission application 246, data read/write routine 254, one or more object recognition and/or OCR routines 256, and/or image validation routine 258 may be stored to suitable portions of program memory 202 upon installation of a package file downloaded in such a manner. Examples of package download files may include downloads via the iTunes store, the Google Play Store, the Windows Phone Store, downloading a package installation file from another computing device, etc. Once downloaded, vehicle accident claim submission application 246 may be installed on device 200 as part of an installation package such that, upon installation of vehicle accident claim submission application 246 on mobile computing device 200, data read/write routine 254, one or more object recognition and/or OCR routines 256, and/or image validation routine 258 may also be installed.

Although FIG. 2 depicts one program memory 202, one MP 206, and one RAM 208, controller 240 may include any suitable number and/or type of program memories, microprocessors, and/or RAM. Furthermore, although FIG. 2 depicts I/O interface 210 as a single block, various aspects of I/O interface 210 may include any suitable number and/or types of I/O interfaces.

Figure 3:
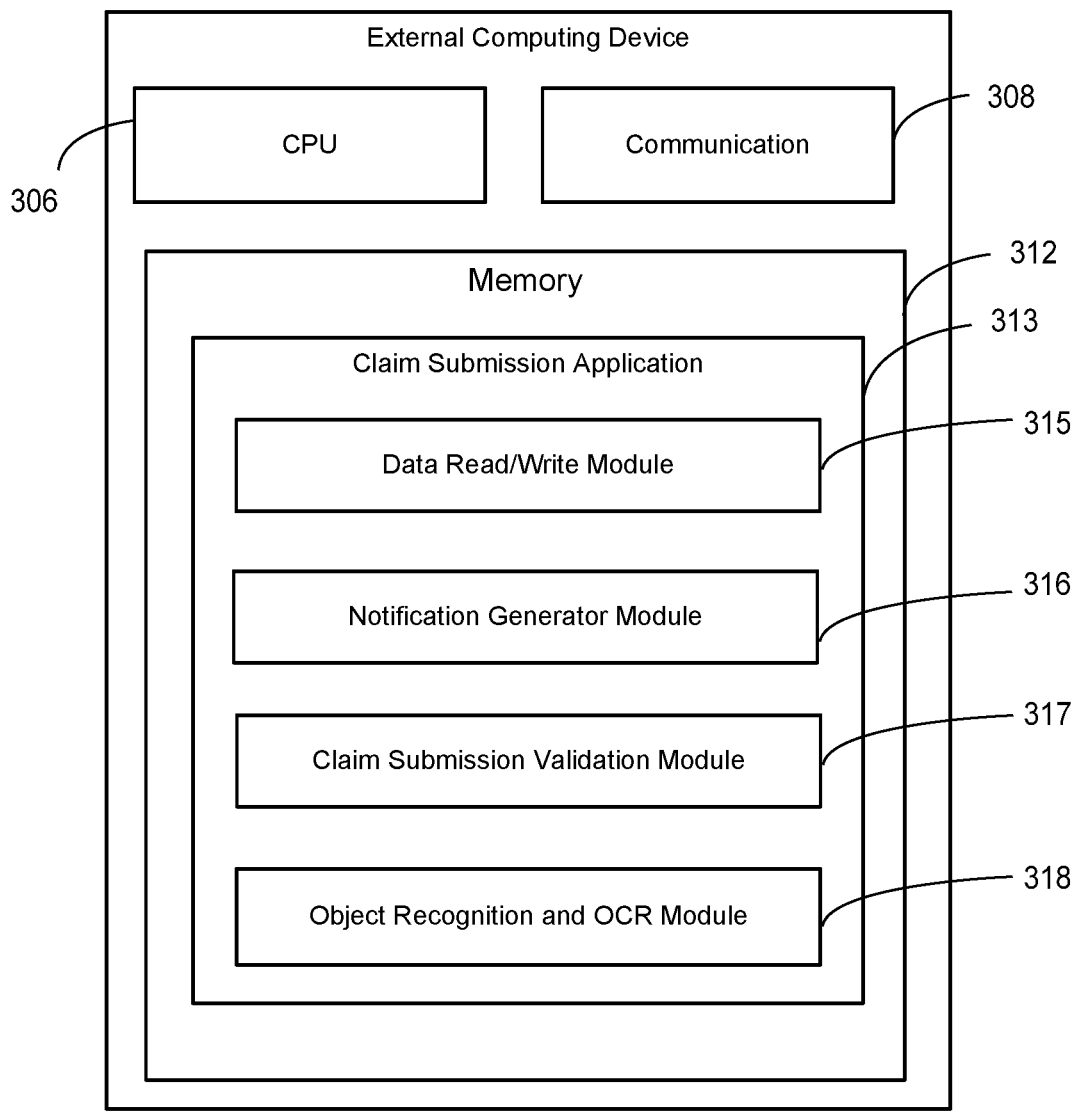
FIG. 3 illustrates a block diagram of an exemplary external computing device 300.

FIG. 3 illustrates a block diagram of an exemplary external computing device 300. In one aspect, external computing device 300 may be an implementation of external computing device 114, as shown in FIG. 1. External computing device 300 may include a central processing unit (CPU) 306, a communication unit 308, and/or a memory 312.

In various aspects, external computing device 300 may work in conjunction with a mobile computing device (e.g., mobile computing device 200) to perform substantially similar functions as the mobile computing device would when acting in accordance with standalone aspects (i.e., local processing aspects with respect to the mobile computing device).

For example, a user may send a request to submit an insurance claim, which is received by external computing device 300. Continuing this example, external computing device 300 may receive the request and any associated policy information, user logon credentials, vehicle information, time and date stamps, etc., generate an insurance form corresponding to the requested insurance claim, and send a notification to the mobile computing device to cause the mobile computing device to display the one or more insurance forms associated with the vehicular accident.

Further continuing this example, external computing device 300 may receive one or more captured images associated with the vehicular accident from the mobile computing device and extract image data from the one or more images using one or more object recognition and/or OCR processes, send the image data to the mobile computing device where it is utilized by the mobile computing device to populate one or more fields of the insurance form, receive the completed form data from the mobile computing device, and/or use the completed form data to submit an insurance claim.

CPU 306 may be configured to communicate with memory 312 to store data to and read data from memory 312. Memory 312 may have a structure substantially similar to program memory 202 and, when the various modules stored in memory 312 are executed by CPU 306, may provide substantially the same functionality as the various modules stored in program memory 202 when executed by MP 206; therefore, only differences between program memory 202 and memory 312 will be further described.

Communication unit 308 may have a structure substantially similar to communication unit 230 and provides substantially the same functionality as communication unit 230; therefore, only differences between communication unit 230 and communication unit 308 will be further described.

In various aspects, communication unit 308 may be configured to facilitate data communications between external computing device 300, one or more mobile computing devices (e.g., mobile computing device 200), one or more storage devices (e.g., storage device 118), etc. Communication unit 308 may perform such communications directly (e.g., via a dedicated wired or wireless link) or indirectly (e.g., via networked communications).

Communication unit 308 may send data to and receive data from a mobile computing device including, for example, one or more images associated with a vehicular accident, insurance policy data, policy holder data (e.g., login credentials identifying the policy holder), application data and/or metadata associated with the one or more images, insurance claim forms, answers to insurance claim form fields, answers provided by users interacting with their respective mobile computing devices (e.g., a state in which a driver's license has been issued), etc.

Memory 312 may include a claim submission application 313 and one or more memory modules utilized by claim submission application 313 such as a data read/write module 315, a notification generator module 316, a claim submission validation module 317, and an object recognition and OCR module 318. Claim submission application 313 may work in conjunction with the one or more modules to perform one or more functions of the aspects as described herein.

Claim submission application 313 may include instructions that, when executed by CPU 306, facilitate the implementation of a web-based and/or mobile-based application platform. This application platform may be utilized, for example, in conjunction with an insurer infrastructure to support interactions between one or more mobile computing devices, to submit insurance claims, and/or to maintain policy claim information up-to-date.

For example, one or more policy holders may communicate with external computing device 300 (e.g., via their respective mobile computing devices 200) to login, to view their respective policy profiles, to submit claim requests, to submit one or more images associated with a vehicular accident, to submit insurance claim form data, etc.

CPU 306 may execute instructions stored in data read/write module 316 to perform acts substantially similar to those performed by MP 206 when executing instructions stored in read/write routine 254; therefore, only differences between the functionality resulting from the execution of read/write routine 254 and data read/write module 316 will be further described.

In one aspect, CPU 306 may execute instructions stored in data read/write module 315 to read data from and/or to write data to one or more storage devices via communication unit 308. In some aspects, instructions stored in data read/write module 315 may facilitate external computing device 300 accessing data in one or more storage devices as users interact with the web-based application supported by claim submission application 313. In other aspects, instructions stored in data read/write module 315 may facilitate external computing device 300 accessing data in one or more storage devices automatically upon claim submission application 313 executing instructions in data read/write module 315.

In one aspect, CPU 306 may execute instructions stored in notification generator module 316 to generate notifications and/or to send notifications to one or more mobile computing devices via communication unit 308. Additionally or alternatively, notification generator module 316 may include instructions that, when executed by CPU 306, causes communication unit 308 to send notifications to one or more mobile computing devices indicative of an image validation result, which may be performed by CPU 306 executing instructions stored in claim submission validation module 317, for example, and is further discussed below.

CPU 306 may execute instructions stored in claim submission validation module 317 to perform acts substantially similar to those performed by MP 206 when executing instructions stored in image validation routine 258; therefore, only differences between the functionality resulting from the execution of claim submission validation module 317 and image validation routine 258 will be further described.

CPU 306 may execute instructions stored in claim submission validation module 317 to facilitate providing feedback to a user (e.g., via instructions executed via notification generator module 316). For example, upon receiving one or more images associated with a vehicular accident, external computing device 300 may determine whether image data may be extracted from the one or more images, whether the one or more images are of too low quality for image data extraction, whether insurance claim form data has been successfully received at external computing device 300, whether an insurance claim has been successfully submitted and/or opened, etc. CPU 306 may execute instructions stored in notification generator module 316 to relay this determination to one or more mobile computing devices via data transmitted using communication unit 308, for example.

In one aspect, CPU 306 may execute instructions stored in object recognition and OCR module 318 to perform acts substantially similar to those performed by MP 206 when executing instructions stored in object recognition and OCR routines 256; therefore, only differences between the functionality resulting from the execution of object recognition and OCR module 318 and OCR routines 256 will be further described.

For example, CPU 306 may execute instructions stored in object recognition and OCR module 318 to perform any suitable number of object recognition processes and/or OCR processes on one or more received images associated with a vehicular accident. As previously discussed with reference to mobile computing device 200, as shown in FIG. 2, object recognition and OCR module 318 may correspond to any suitable number and/or type of object recognition and/or OCR processes.

In one aspect, CPU 306 may execute instructions stored in object recognition and OCR module 318 to perform any suitable combination of object recognition and/or OCR processes based upon the type of image that is received from a mobile computing device. For example, if the image received is of a portion of a vehicle involved in a vehicular accident, then CPU 306 may execute instructions stored in object recognition and OCR module 318 to perform object recognition and OCR, for example.

Object recognition may include, for example, external computing device 300 communicating with one or more storage devices to compare the object of the vehicle to one or more vehicle images stored in the one or more storage device. Once a match is identified, the associated vehicle data from the matched vehicle image may be used as the extracted data to prepopulate corresponding insurance form data, such as the vehicle's year, make, model, etc. In the case of a vehicle, any suitable type of OCR may be utilized in addition to object recognition to further identify textual components in the vehicle image, such as a license plate number, for example.

To provide another example, if the image received is of an occupant driver's license who was involved in a vehicular accident, then CPU 306 may execute instructions stored in object recognition and OCR module 318 to perform one or more OCR processes without having to perform the object recognition.

Exemplary Screenshots

Figure 4B:
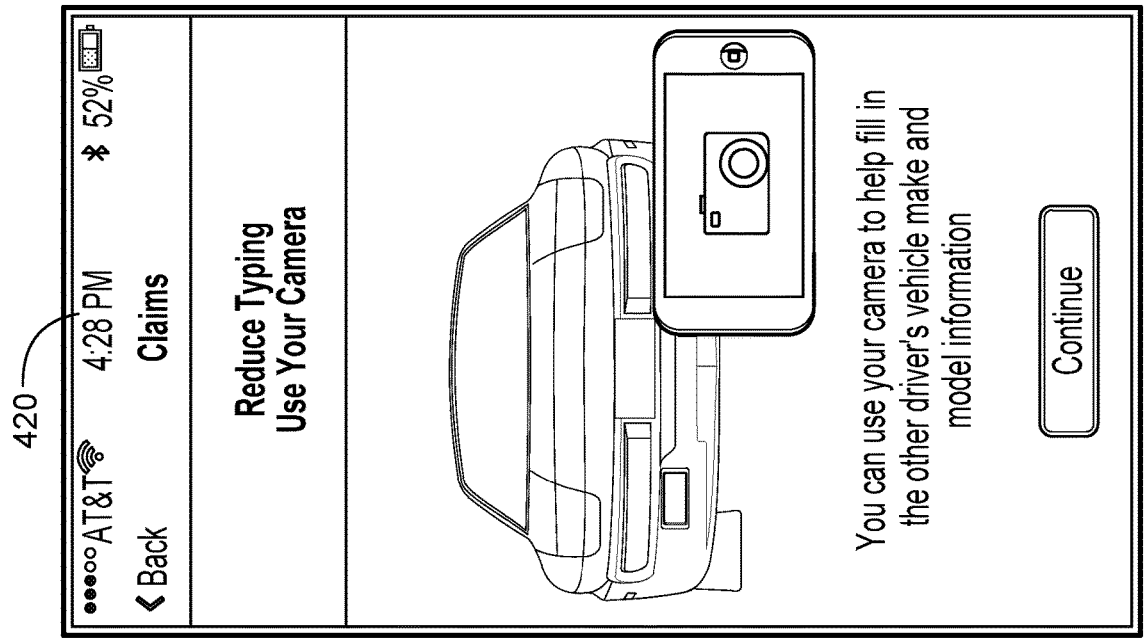
FIG. 4B illustrates an exemplary screenshot 420 that may be displayed on a mobile computing device upon a user selecting to add vehicle, occupants, and/or witnesses to an insurance claim form.
Figure 4A:
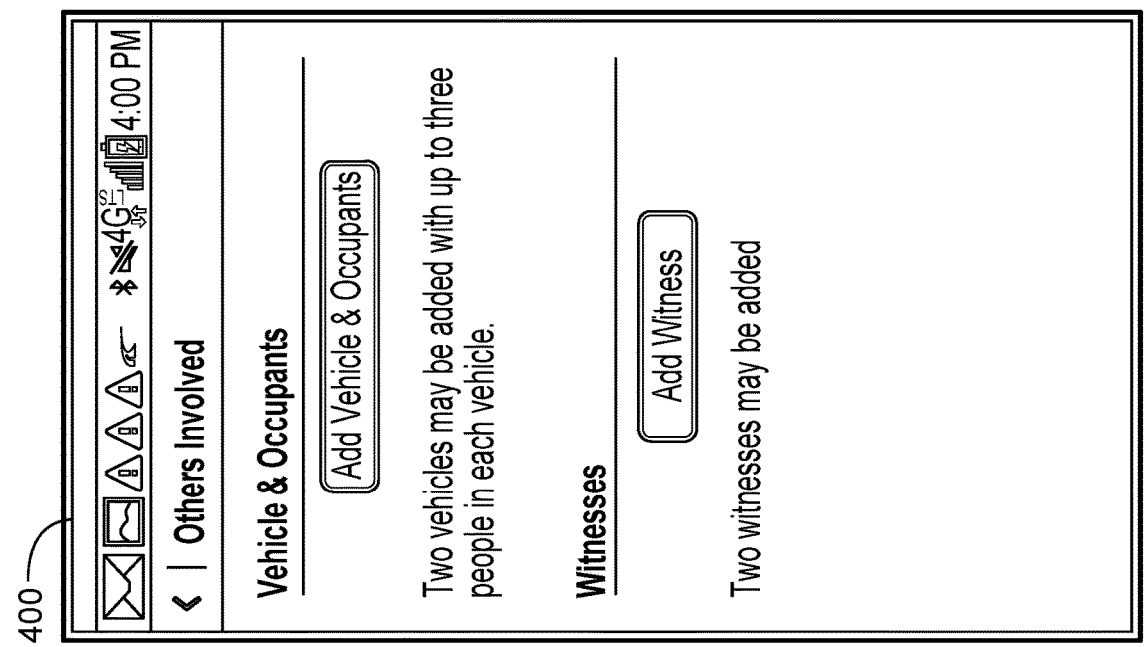
FIG. 4A illustrates an exemplary screenshot 400 that may be displayed on a mobile computing device upon starting a mobile computing device application to submit an insurance claim.

FIG. 4A illustrates an exemplary screenshot 400 that may be displayed on a mobile computing device upon starting a mobile computing device application to submit an insurance claim. In various aspects, screen 400 may be displayed on a mobile computing device, such as mobile computing device 106 or mobile computing device 200, for example, as shown in FIGS. 1 and 2, respectively. In accordance with such aspects, screen 400 may be displayed as part of a device display, such as display 216, for example, as shown in FIG. 2.

In some aspects, screen 400 may be displayed upon a user launching, executing, and/or initiating a respective application that has been installed on the mobile computing device, which may correspond to vehicle accident claim submission application 246, for example, as shown in FIG. 2. For example, screen 400 may be displayed upon a user selecting a suitable icon from an interactive display implemented by a mobile computing device, resulting in the application being launched.

Upon the application being launched, a user may be presented with an introductory screen, splash screen and/or a login screen in which to provide logon credentials to access his policy profile information. Additionally or alternatively, providing logon credentials may facilitate an external computing device to associate the submitted claim with the insurer's profile and/or policy number and/or to upon transmit the appropriate insurance claim forms to the mobile computing device.

Furthermore, upon providing the proper logon credentials, such as a username and password, for example, the mobile computing device may communicate with one or more external computing devices (e.g., external computing device 114) to access policy data corresponding to the identified username, resulting in the display of screen 400, as shown in FIG. 4A. Introductory screens displayed prior to the one shown in FIG. 4A are not shown for purposes of brevity.

In one aspect, any suitable maximum number may be associated with the number of vehicles, occupants, and/or witnesses that may be selected for claim submission. For example, as shown in FIG. 4A, screenshot 400 indicates that two vehicles with up to three people may be selected, and that two witnesses may be added. However, various aspects may include any suitable number of vehicles, occupants, and/or witnesses being entered to an insurance claim form.

FIG. 4B illustrates an exemplary screenshot 420 that may be displayed on a mobile computing device upon a user selecting to add a vehicle, occupants, and/or witnesses to an insurance claim form. For example, FIG. 4B illustrates an exemplary screenshot 420 that may be displayed upon a user selecting "add vehicles & occupants" from screen 400, as shown in FIG. 4A. To provide another example, screenshot 420 may be displayed upon a user selecting "add witness" from screen 400.

In one aspect, screenshot 420 may function to relay information to a user that one or more images may be captured to fill in insurance form data, such as the vehicle's make and model information, for example. Upon acknowledging this, a user may select the "continue" button to capture an image of a vehicle, occupant, and/or witness based upon the selection from screenshot 400, which is further discussed below.

Figure 5B:
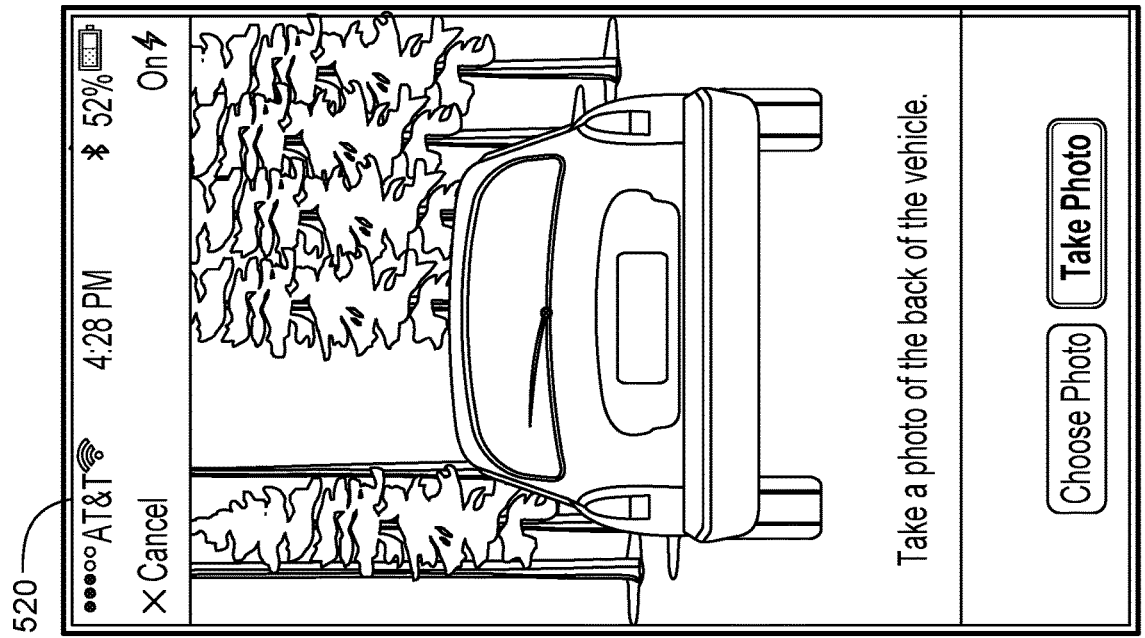
FIG. 5B illustrates an exemplary screenshot 520 that may be displayed on a mobile computing device to capture or select an image of a vehicle involved in an accident.
Figure 5A:
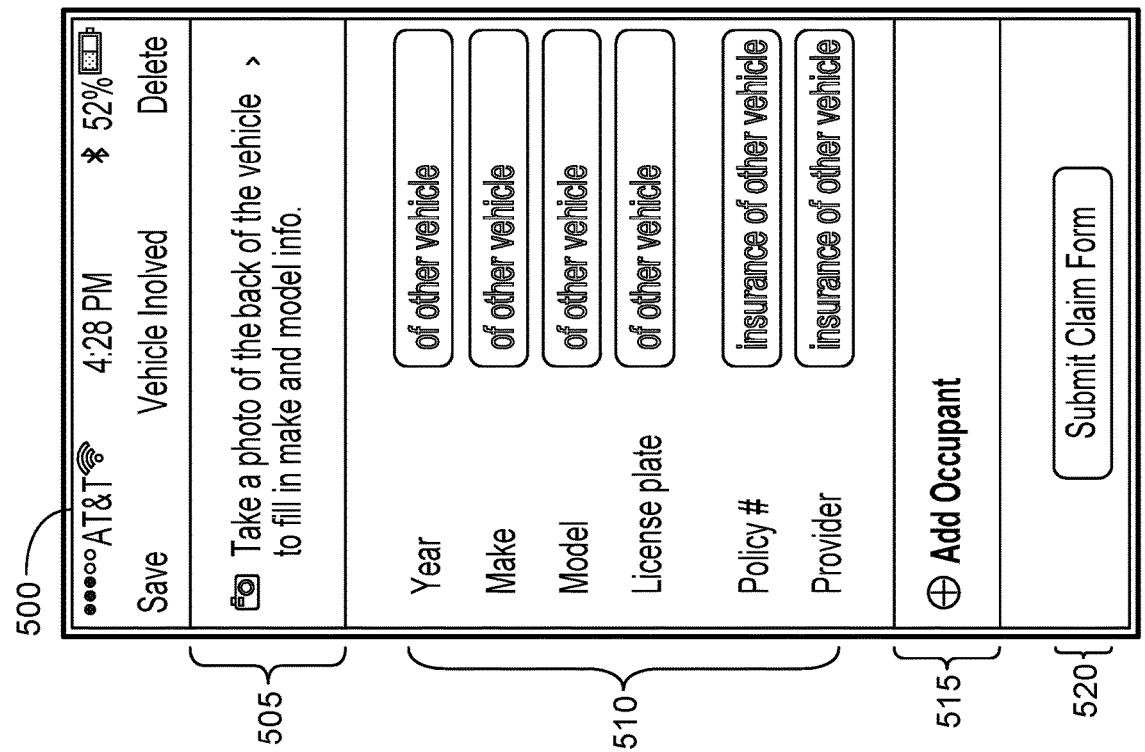
FIG. 5A illustrates an exemplary screenshot 500 that may be displayed on a mobile computing device to enable the collection of insurance form data for a vehicle involved in an accident.

FIG. 5A illustrates an exemplary screenshot 500 that may be displayed on a mobile computing device to enable the collection of insurance form data for a vehicle involved in an accident. Screenshot 500 may be displayed upon a user selecting the option to "add vehicle & occupants" from screenshot 400, as shown in FIG. 4A, and then selecting "continue" from screenshot 420, as shown in FIG. 4B.

As shown in FIG. 5A, screenshot 500 may include portions 505, 510, 515, and 520. Portion 505 may include an interactive label, text, graphic, etc., such as the text shown in FIG. 5A "take a photo of the back of the vehicle to fill in make and model of vehicle." A user may select portion 505 to take an image of the vehicle, which is further discussed below with respect to FIG. 5B, to automatically populate one or more of the insurance form data fields in portion 510 and avoid manual entry.

As shown in FIG. 5A, portion 510 may include several insurance form data fields corresponding to a vehicle involved in the accident. In one aspect, a user may select one or more of the insurance form data fields in portion 510 by tapping a respective field and using a virtual keyboard, for example, to enter information manually.

Portion 515 may include an interactive label, text, graphic, etc., such as the text shown in FIG. 5A "add occupant." A user may select portion 515 (e.g., by tapping or performing a suitable gesture) to add one or more occupants corresponding to the selected vehicle involved corresponding to the data fields show in portion 510, which is further discussed below.

Portion 520 may include an interactive label, text, graphic, etc., such as the button shown in FIG. 5A as "submit claim form." Once completed with any combination of manual and image data populated entries (which may include, for example, alphanumeric characters), a user may submit a completed insurance form to an external computing device (e.g., external computing device 114) to initiate the claim submission process.

FIG. 5B illustrates an exemplary screenshot 520 that may be displayed on a mobile computing device to capture or select an image of a vehicle involved in an accident. Screenshot 520 may be displayed upon a user selecting the option from portion 505 of screenshot 500, as shown in FIG. 5A. In another aspect, screenshot 520 may be displayed as part of the initiation of a suitable image capture device associated with the mobile computing device (e.g. image capture device 226).

As shown in FIG. 5B, screenshot 520 may include options to take a new photo of the vehicle ("take photo") or to choose a previously taken photo ("choose photo") that may be stored in a suitable memory utilized by the mobile computing device. Once a photo is selected, the image data may be extracted to populate one or more insurance form fields, which is further discussed below with respect to FIG. 5C.

Figure 5C:
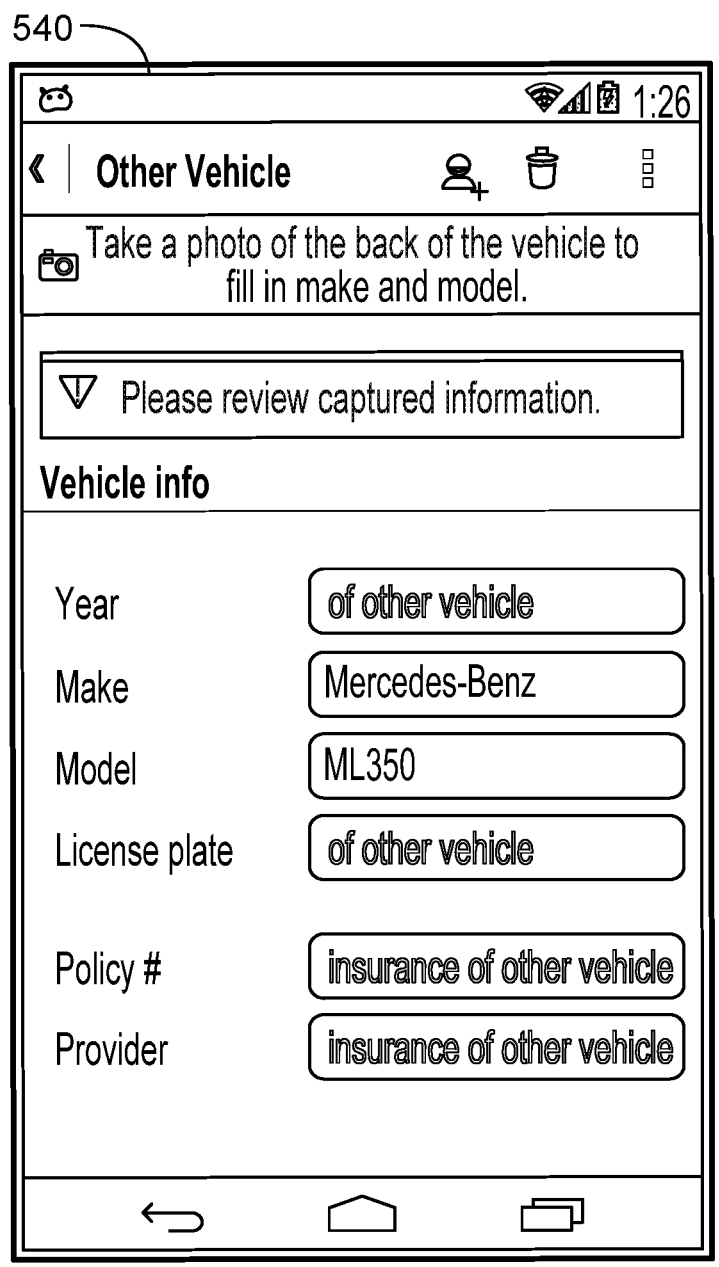
FIG. 5C illustrates an exemplary screenshot 540 that may be displayed on a mobile computing device upon image data being extracted from an image of a vehicle involved in a vehicular accident.

FIG. 5C illustrates an exemplary screenshot 540 that may be displayed on a mobile computing device upon image data being extracted from an image of a vehicle involved in a vehicular accident. For example, upon a user selecting the option "choose photo," as shown in FIG. 5B, the mobile computing device may display screenshot 540.

As shown in FIG. 5C, screenshot 540 may include the same insurance form fields as shown in FIG. 5A, with some of the fields (e.g., make and model) being populated without manual entry by the user. As previously discussed, the data used to populate these fields may be extracted from the image chosen in FIG. 5B using any suitable number and/or type of object recognition and/or OCR processes.

In one aspect, a user may select one or more fields shown in FIG. 5C to manually override incorrect answers and/or to manually provide answers to fields that have not been populated based upon the extracted image data. Once a user determines that the form field data is correct, the user may choose to send the insurance form field data to an external computing device (e.g., external computing device 114) by scrolling down to portion 520, as shown in FIG. 5A, to submit the claim form. Alternatively, a user may choose to scroll down to portion 515, as shown in FIG. 5A, to add occupants to the vehicle or to add additional vehicles, occupants, witnesses, etc.

Although not shown in FIG. 5C for purposes of brevity, a user may select the option to add additional vehicles via a suitable interactive menu option, icon, etc., which may result in the mobile device displaying screenshot 400, as shown in FIG. 4A. In one aspect, the user may repeat the process as described with respect to FIGS. 4-5 to add any suitable number of vehicles, occupants, and/or witnesses to the insurance claim form such that a submitted insurance for includes this information.

FIG. 6A illustrates an exemplary screenshot 600 that may be displayed on a mobile computing device to enable the collection of insurance form data for an occupant of a vehicle involved in an accident. In one aspect, screenshot 600 may be displayed on a mobile computing device upon a user selecting the "add occupant" option from portion 515 of screenshot 500, as shown in FIG. 5A.

Similar to FIG. 5A, screenshot 600 may include several insurance form data fields corresponding to an occupant of a vehicle involved in the accident. In one aspect, the occupant may correspond to an occupant of the vehicle for which a user entered insurance form field data as previously discussed with respect to FIGS. 4A-4C. A user may select one or more of the insurance form data fields in screenshot 600 by tapping a respective field and using a virtual keyboard, for example, to enter information manually.

Similar to screenshot 500, screenshot 600 may include an interactive label, text, graphic, etc., such as the text shown in FIG. 6A "take a photo of the back of the driver's license or state ID to fill in occupant info." In one aspect, a user may select this portion of screenshot 600 to take an image of the occupant's driver's license, which is further discussed below with respect to FIG. 6C, to automatically populate one or more of the insurance form data fields in screenshot 600 and avoid manual entry.

FIG. 6B illustrates an exemplary screenshot 620 that may be displayed on a mobile computing device upon a user selecting the option to take a photo of a driver's license or state ID. In one aspect, screenshot 620 may be displayed upon a user selecting the option to "take a photo of the back of the driver's license or state ID to fill in occupant info," as shown in screenshot 600. Although screenshot 620 is provided herein as a transition from screenshot 600, which specifies an occupant of a vehicle, various aspects may include screenshot 620 being displayed upon a user selecting the option to take a picture of a driver's license of any person involved with a vehicular accident, such as vehicle occupants, witnesses etc.

Because some states may prohibit automated data capture using driver's license images, aspects may include a user first identifying the issuing state or province corresponding to the driver's license that is to be captured (e.g., for the occupant, witness, etc. selected from screenshot 600). If the identified state or province matches a state or province that does not allow automated data capture, then aspects may include a notification being displayed that the form data should be filed in manually. If the identified state or province matches a state or province that allows for automated data capture, then aspects may include the mobile computing device transitioning to another screen to capture a driver's license image of the person selected in screenshot 600, as further discussed below with respect to FIG. 6C.

Furthermore, the designs or templates used for driver's licenses and/or state IDs may vary from state to state, and a single state may also use different templates or designs. That is, the physical location of the same information, such as a name and address, may not be located in the same portion of a driver's license or state ID for different issuing states, or even for varying designs from the same issuing state. This leads to the existence of a large number (e.g., 200 or 300) of various state ID and driver's license containing information in varying positions and locations.

In performing the OCR and/or object recognition techniques (e.g., via mobile computing device 200 and/or external computing device 300) it is helpful to determine the location within an image that the data extraction process is directed. For example, an OCR technique may be performed on a precise range of pixels within the acquired image in which a name, an address field, etc., is located. But iteratively comparing each stored driver's license and state ID template to the acquired image to determine the correct state (or performing a trial and error process attempting to obtain the correct extracted information) would be processor-intensive and time consuming.

Therefore, embodiments include the selection of the state in FIG. 6B narrowing the selection of templates and/or designs to the selected state, which are then used in conjunction with OCR and/or object recognition technique applied to the acquired image. In this way, the selection of a state, as shown in FIG. 6B, increases the speed and efficiency of the information data extraction process from an acquired image of a driver's license or state ID.

Figure 6C:
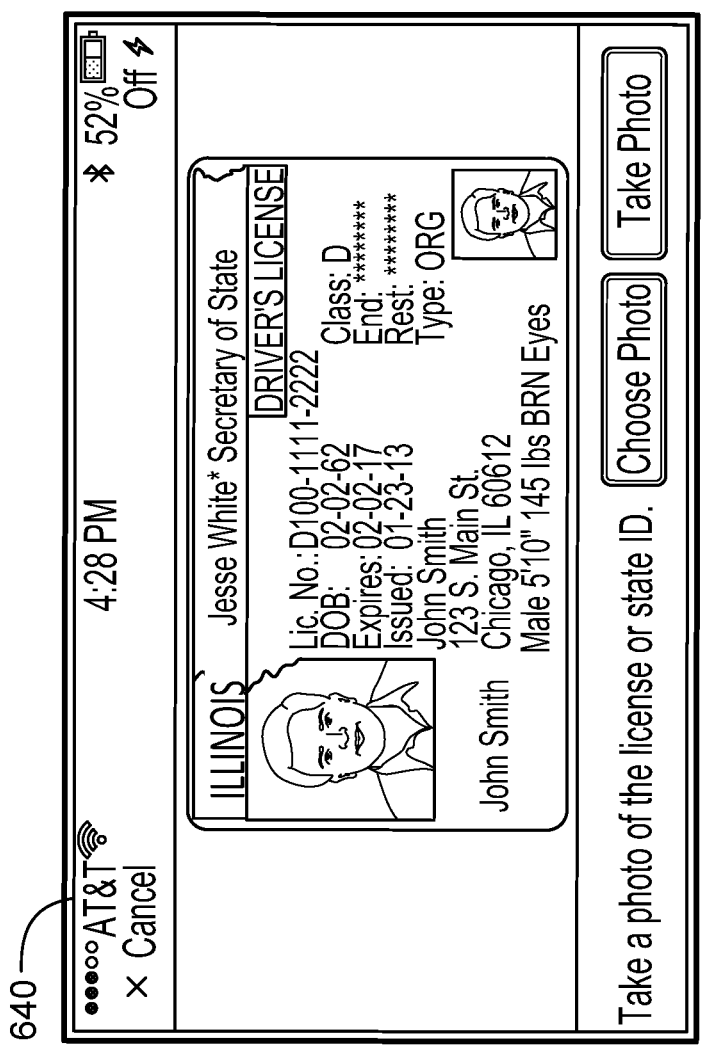
FIG. 6C illustrates an exemplary screenshot 640 that may be displayed on a mobile computing device to capture or select an image of a person's driver's license involved in a vehicular accident.

FIG. 6C illustrates an exemplary screenshot 640 that may be displayed on a mobile computing device to capture or select an image of a person's driver's license involved in a vehicular accident. In one aspect, screenshot 640 may be displayed upon a user selecting the option "take a photo of the back of the driver's license or state ID to fill in occupant info," from screenshot 600, as shown in FIG. 6A and a state from screenshot 620 corresponding to a state in which automated data capture from such images is allowed. In one aspect, screenshot 640 may be displayed as part of the initiation of a suitable image capture device associated with the mobile computing device (e.g. image capture device 226).

Similar to screenshot 520, as shown in FIG. 5B, screenshot 640 may include options to take a new photo of the driver's license or state ID ("take photo") or to choose a previously taken photo ("choose photo") that may be stored in a suitable memory utilized by the mobile computing device. Once a photo is selected, the image data may be extracted to populate one or more insurance form fields, which is further discussed below with respect to FIG. 6D.

Figure 6D:
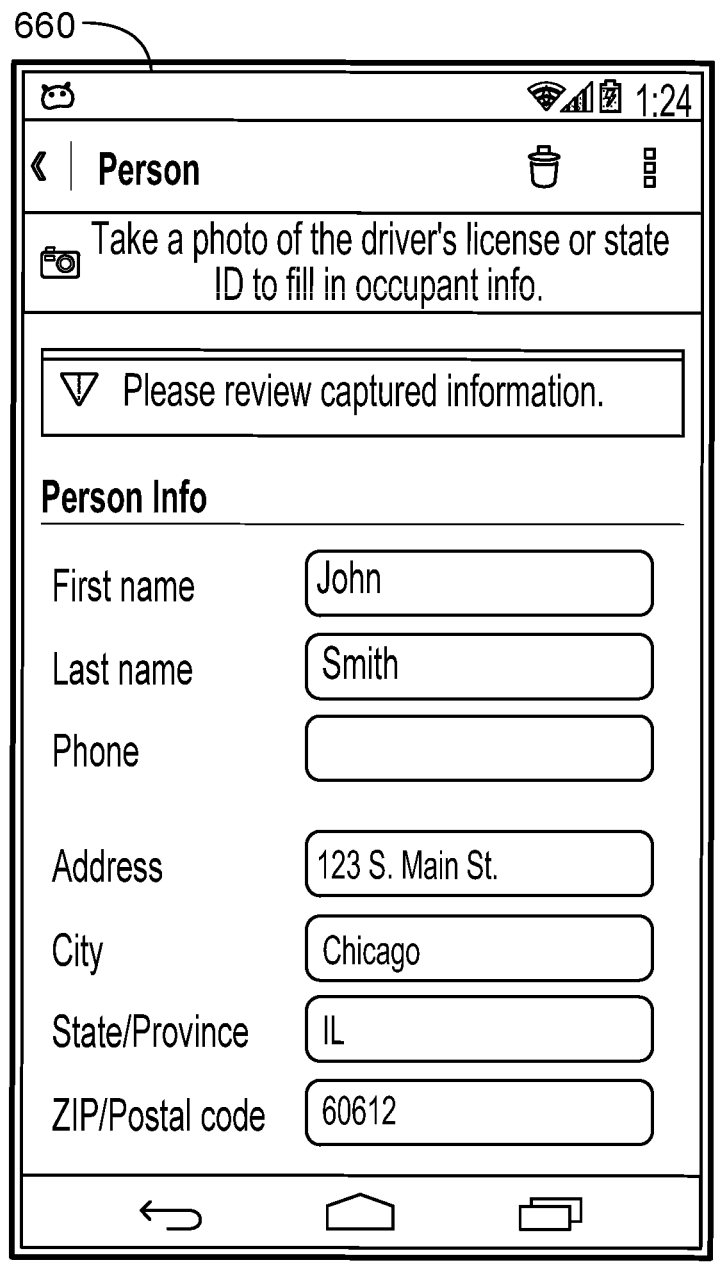
FIG. 6D illustrates an exemplary screenshot 660 that may be displayed on a mobile computing device upon image data being extracted from an image of a person's driver's license involved in a vehicular accident.

FIG. 6D illustrates an exemplary screenshot 660 that may be displayed on a mobile computing device upon image data being extracted from an image of a person's driver's license involved in a vehicular accident. For example, upon a user selecting the "choose photo" option, as shown in FIG. 6C, the mobile computing device may display screenshot 660.

As shown in FIG. 6D, screenshot 660 may include the same insurance form fields as shown in FIG. 6A, with some of the fields being populated without manual entry by the user. As previously discussed, the data used to populate these fields may be extracted from the image chosen in FIG. 6C using any suitable number and/or type of object recognition and/or OCR processes.

In one aspect, a user may select one or more fields shown in FIG. 6D to manually override incorrect answers and/or to manually provide answers to fields that have not been populated based upon the extracted image data. Once a user determines that the form field data is correct, the user may choose to send the insurance form field data to an external computing device (e.g., external computing device 114) via a suitable interactive menu option, icon, etc., which is not shown in FIG. 6D for purposes of brevity.

The mobile computing device may additionally or alternatively include any suitable number of navigating options to return to screen 500 and facilitate the entry of additional occupants. Furthermore, the mobile computing device may additionally or alternatively include any suitable number of navigating options to return to screen 400 to facilitate the entry of one or more vehicles witnesses.

In one aspect, a user may repeat the process of adding vehicles, occupant, and/or witnesses as described with respect to FIGS. 4-6 to add any suitable number of vehicles, occupants, and/or witnesses to the insurance claim form such that a submitted insurance includes this information.

To provide an illustrative example, the steps described with respect to FIGS. 6A-6D to add vehicle occupant data to an insurance claim form may be repeated to add one or more witnesses to an insurance claim form. That is, upon adding all occupants of a vehicle, a user may utilize one or more navigation buttons displayed by the mobile computing device (not shown for purposes of brevity) to return to screen 400, whereby a user may select the "add witness" option. In one aspect, the mobile computing device may repeat the same steps to add a witness as those explained with reference to FIGS. 6A-6D to add an occupant, such that a completed insurance claim form sent to an external computing device includes this information.

Exemplary Method of Submitting an Insurance Claim

Figure 7:
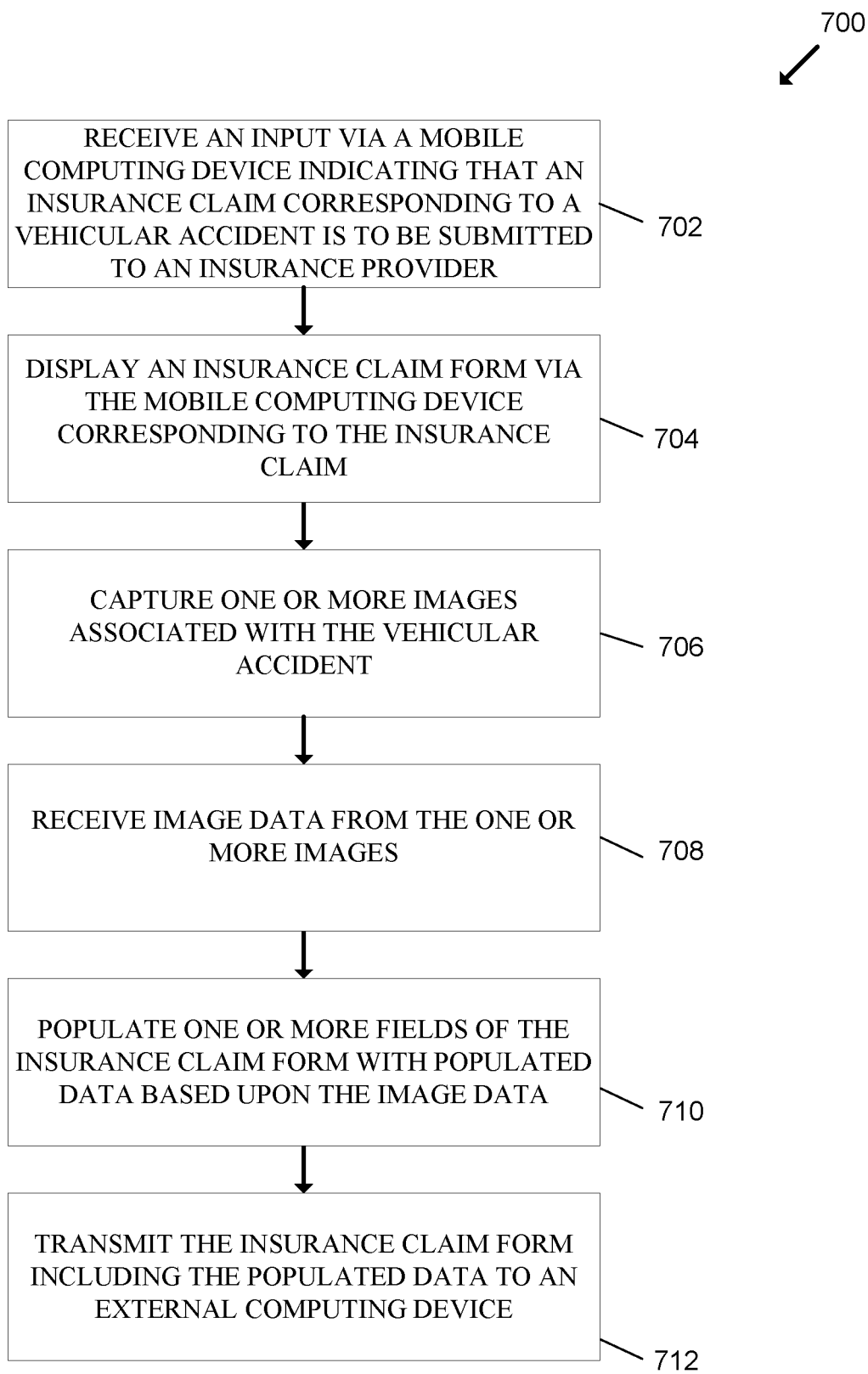
FIG. 7 illustrates an example method 700 in accordance with an exemplary aspect of the present disclosure.

FIG. 7 illustrates an example method 700 in accordance with an exemplary aspect of the present disclosure. In the present aspect, method 700 may be implemented by any suitable computing device (e.g., mobile computing device 106 or external computing device 114, as shown in FIG. 1). In one aspect, method 700 may be performed by one or more processors, applications, and/or routines, such as any suitable portion of controller 240, software applications 244, and/or software routines 252, for example, as shown in FIG. 2.

Method 700 may start when one or more processors receive an input via a mobile computing device indicating that an insurance claim corresponding to a vehicular accident is to be submitted to an insurance provider (block 702). This may include, for example, an input generated via a user interface utilized by the mobile computing device, such as a user opening an application installed on the mobile computing device (block 702). Upon receipt of the input (block 702) aspects include the mobile computing device sending an indication to an external computing device that an insurance claim is to be submitted, thereby causing the external computing device to download the insurance claim form and send the insurance claim form to the mobile computing device (block 702).

Method 700 may include one or more processors displaying an insurance claim form via the mobile computing device corresponding to the insurance claim (block 704). This may include, for example, the mobile computing device communicating with an external computing device (e.g., external computing device 114) to receive the insurance claim form (block 704). The insurance claim form may include, for example, one or more form fields, as shown and previously discussed with respect to FIGS. 5A and 6A (block 704).

Method 700 may include one or more processors capturing one or more images associated with a vehicular accident (block 706). The one or more images may include, for example, images corresponding to one or more vehicles involved in the accident, as shown and previously discussed with respect to FIG. 5B (block 706). To provide another example, the one or more images may include images corresponding to one or more vehicle occupants involved in the accident and/or witnesses to the vehicular accident, as shown and previously discussed with respect to FIG. 6C (block 706).

Method 700 may include one or more processors receiving image data extracted from the one or more images (block 708). In the present aspect, the image data may be received upon being extracted from one or more images associated with the vehicular accident (block 706). The image data may be received via extraction in accordance with any suitable object recognition and/or OCR process (block 708).

Method 700 may include one or more processors populating one or more fields of the insurance claim form with populated data based upon the extracted image data (block 710). This may include, for example, populating insurance form fields with data corresponding to a vehicle involved in the vehicular accident, as previously shown and discussed with respect to FIG. 5C (block 710). To provide another example, this may include populating insurance form fields with data corresponding to one or more vehicle occupants involved in the accident and/or witnesses to the vehicular accident, as previously shown and discussed with respect to FIG. 6D (block 710).

Method 700 may include one or more processors transmitting the insurance claim form including the populated data to an external computing device (block 712). In the present aspect, the insurance claim form may be received by the external computing device and utilized to facilitate filing and/or submission of an insurance claim associated with the vehicular accident (block 712). Method 700 may include additional, less, or alternate actions, including those discussed elsewhere herein, and/or may be implemented via a computer system, communication network, one or more processors (such as an insurance customer mobile device and/or a remote server associated with an insurance provider), and/or computer-executable instructions stored on non-transitory storage media or computer-readable medium.

Additional Technical Advantages

In the various aspects described herein, mobile computing device 200 and/or external computing device 300 may facilitate the submission of an insurance claim. Additionally or alternatively, these aspects may provide other benefits relating to the technical operation of mobile computing device 200, external computing device 300, and/or the one or more storage devices.

In various aspects, mobile computing device 200 and/or external computing device 300 may advantageously utilize an object recognition and/or OCR process to extract image data from one or more images associated with a vehicular accident, which may be used to populate insurance form field data. Thus, in accordance with such aspects, mobile computing device 200 and/or external computing device 300 may perform more efficiently by eliminating user error and decreasing the chances that claim form data will need to be resubmitted.

Furthermore, mobile computing device 200 and/or external computing device 300 may also provide benefits such as decreased network bandwidth, as less communication is required between the insurers and policy holders due to the increased chance of the submitted claim forms providing the correct information. And due to the increased efficiency, mobile computing device 200 and/or external computing device 300 may also save power that would otherwise be utilized for the transmission and/or reception of additional insurance claim form processing.

Additional Exemplary Computer-Implemented Method

In one aspect, a computer-implemented method for filing an insurance claim may be provided. The method may include (1) receiving an input via a mobile computing device indicating that an insurance claim corresponding to a vehicular accident is to be submitted to an insurance provider; (2) displaying an insurance claim form via the mobile computing device corresponding to the insurance claim; (3) capturing one or more images associated with the vehicular accident; (4) receiving image data from the one or more images; (5) populating one or more fields of the insurance claim form with populated data based upon the image data; and/or (6) transmitting, by one or more processors, the insurance claim form including the populated data to an external computing device. The insurance claim form may be received by the external computing device and utilized to facilitate filing of the insurance claim associated with the vehicular accident.

Additionally or alternatively, the method may include transmitting the one or more images to the external computing device, and extracting one or more alphanumeric characters from the one or more images as the image data using one or more of (i) object recognition, and (ii) optical character recognition (OCR). The image data may be extracted from one or more images associated with the vehicular accident and/or received from the external computing device.

Additionally or alternatively, the one or more images may include an image of a driver's license of a vehicle occupant involved in the vehicular accident. In such a case, the method may include transmitting an issuing state corresponding to the driver's license.

Additionally or alternatively, aspects described include the mobile computing device receiving a notification from the external computing device that an insurance claim has been successfully opened based upon the transmitted insurance claim form.

Furthermore, the one or more images associated with the vehicular accident may include (1) an image of a rear section of a vehicle involved in the vehicular accident; (2) an image of a driver's license of a driver of one or more vehicles involved in the vehicular accident; (3) an image of a driver's license of a one or more vehicle passengers involved in the vehicular accident; and/or (4) an image of a driver's license of a witness of the vehicular accident.

In addition, the method described may include the mobile computing device generating the insurance claim form by receiving the insurance claim form from the external computing device and displaying the received insurance claim form via the mobile computing device. Additionally or alternatively, the method may include displaying an indication that the insurance claim form was accepted from the external computing device. The method may include additional, less, or alternate actions, including those discussed elsewhere herein, and/or may be implemented via a computer system, communication network, one or more processors (such as an insurance customer mobile device and/or a remote server associated with an insurance provider), and/or computer-executable instructions stored on non-transitory storage media or computer-readable medium.

Exemplary Non-Transitory Medium

In another aspect, a non-transitory, tangible computer-readable medium storing machine readable instructions in mobile computing device is described, that when executed by a processor, causes the processor to: (1) receive an input via a mobile computing device indicating that an insurance claim corresponding to a vehicular accident is to be submitted to an insurance provider; (2) display an insurance claim form via the mobile computing device corresponding to the insurance claim; (3) capture one or more images associated with the vehicular accident; (4) receive image data from the one or more images; (5) populate one or more fields of the insurance claim form with populated data based upon the image data; and/or (6) transmit the insurance claim form including the populated data to an external computing device. The insurance claim form may be received by the external computing device and utilized to facilitate filing of the insurance claim associated with the vehicular accident.

Additionally or alternatively, the non-transitory, tangible computer-readable medium may include instructions that, when executed by the processor, cause the processor to transmit the one or more images to the external computing device and to extract one or more alphanumeric characters from the one or more images as the image data using one or more of (i) object recognition, and (ii) optical character recognition (OCR). The image data may be extracted from one or more images associated with the vehicular accident and/or received from the external computing device.

Additionally or alternatively, the one or more images may include an image of a driver's license of a vehicle occupant involved in the vehicular accident. In such a case, the non-transitory, tangible computer-readable medium may include instructions that, when executed by the processor, cause the processor to transmit an issuing state corresponding to the driver's license.

Additionally or alternatively, aspects described include the non-transitory, tangible computer-readable medium having instructions that, when executed by the processor, cause the processor to receive a notification from the external computing device that an insurance claim has been successfully opened based upon the transmitted insurance claim form.

Furthermore, the one or more images associated with the vehicular accident may include (1) an image of a rear section of a vehicle involved in the vehicular accident; (2) an image of a driver's license of a driver of one or more vehicles involved in the vehicular accident; (3) an image of a driver's license of a one or more vehicle passengers involved in the vehicular accident; and/or (4) an image of a driver's license of a witness of the vehicular accident.

In addition, the non-transitory, tangible computer-readable medium may include instructions that, when executed by the processor, cause the processor to generate the insurance claim form by receiving the insurance claim form from the external computing device and to display the received insurance claim form via the mobile computing device. Additionally or alternatively, the non-transitory, tangible computer-readable medium may include instructions that, when executed by the processor, cause the processor to display an indication that the insurance claim form was accepted from the external computing device. The non-transitory, tangible computer-readable medium may include instructions that, when executed by the processor, cause the processor to perform additional, less, or alternate functionality, including that discussed elsewhere herein.

Exemplary Mobile Computing Device

In yet another aspect, a mobile computing device is described that includes (1) a communication unit configured to receive an input indicating that an insurance claim corresponding to a vehicular accident is to be submitted to an insurance provider; (2) a display configured to display an insurance claim form via the mobile computing device corresponding to the insurance claim; (3) an image capture device configured to capture one or more images associated with the vehicular accident; and/or (4) a processor configured to receive image data from the one or more images and to populate one or more fields of the insurance claim form with populated data based upon the image data. The insurance claim form may be received by the external computing device and utilized to facilitate filing of the insurance claim associated with the vehicular accident. The communication unit may be additionally configured to transmit the insurance claim form including the populated data to an external computing device, while the insurance claim form may be received by the external computing device and utilized to facilitate filing of the insurance claim associated with the vehicular accident.

Additionally or alternatively, the communication unit may be additionally configured to transmit the one or more images to the external computing device. The external computing device may alternatively or additionally be configured to extract one or more alphanumeric characters from the one or more images as the image data using one or more of (i) object recognition, and (ii) optical character recognition (OCR). The image data may be extracted from one or more images associated with the vehicular accident and/or received from the external computing device.

Additionally or alternatively, the one or more images may include an image of a driver's license of a vehicle occupant involved in the vehicular accident. In such a case, the communication unit may be configured to transmit an issuing state corresponding to the driver's license.

Additionally or alternatively, the communication unit may be additionally configured to receive a notification from the external computing device that an insurance claim has been successfully opened based upon the transmitted insurance claim form.

Furthermore, the one or more images associated with the vehicular accident may include (1) an image of a rear section of a vehicle involved in the vehicular accident; (2) an image of a driver's license of a driver of one or more vehicles involved in the vehicular accident; (3) an image of a driver's license of a one or more vehicle passengers involved in the vehicular accident; and/or (4) an image of a driver's license of a witness of the vehicular accident.

Additionally or alternatively, the processor may be configured to generate the insurance claim form via the communication unit receiving the insurance claim form from the external computing device, and to display may be configured to display the received insurance claim form. The display may also be configured to display an indication that the insurance claim form was accepted from the external computing device. The mobile computing device may be configured to perform additional, less, or alternate functionality, including that discussed elsewhere herein.

Additional Embodiments

The present embodiments may relate to, inter alia, reporting vehicle accident and/or completing online or virtual insurance claims, such as via a mobile device. Auto insurance customers involved with an automobile accident may complete an insurance claim at the scene of the accident using their mobile device (and/or an application installed on the mobile device or by wirelessly accessing an internet site associated with their insurance provider). During the process of completing the virtual insurance claim, the mobile device (or mobile device application) may prompt the insurance customer to enter information about the other motorist involved in the accident, including information about the other motorist's vehicle that was involved in the accident. The mobile device (or mobile device application) may further prompt the insurance customer to take one or more photographs of the other motorist's vehicle (and/or the other motorist's driver's license) using their mobile device. The mobile device (or mobile device application) may perform computer analysis on the photograph(s) taken and extract certain information about the other motorist's vehicle (and/or the other motorist). For instance, the photograph(s) and/or associated digital or other image data may be analyzed by object recognition software (to recognize objects, such as vehicles) and/or Optical Character Recognition (OCR) software (to recognize text, letters (e.g., name of vehicle make), numbers (e.g., license plate number), etc.) installed on the mobile device or part of the mobile device application associated with the virtual insurance claim.

The mobile device (or mobile device application) may then automatically fill in, select answers for, or pre-populate certain fields within the insurance claim (or mobile device application) associated with the other motorist's vehicle (and/or the other motorist) based upon the computer analysis of the photograph(s) taken and/or the data extracted therefrom. The mobile device (or mobile device application) may automatically fill in fields associated with the vehicle make, model, year, age, and/or license plate of the other motorist's vehicle that was involved in the accident.

Once the insurance customer has completed filling out the virtual insurance claim, the insurance customer may submit the virtual insurance claim to the insurance provider for handling via wireless communication from the customer's mobile device to a remote server or processor associated with the insurance provider. The insurance provider may then promptly handle the auto insurance claim, and/or adjust or update customer information or auto insurance policies, premiums, rates, discounts, etc. accordingly.

Noted above, the present embodiments disclose systems and methods that may relate to insurance and/or insurance claims, such as auto insurance claims resulting from automobile accidents. Image data may be gathered from customers, such as at or via a customer mobile device (e.g., smart phones, smart glasses, smart watches, smart wearable devices, smart contact lenses, smart cameras, and/or other devices capable of wireless communication). After a vehicle accident has occurred, an insurance customer may take pictures (using their mobile device) of the other motorist's vehicle involved in the accident. Computer analysis, such as object recognition and/or optical character recognition, may be performed on the images of the other motorist's vehicle (either by the customer's mobile device and/or at an insurance provider remote server). Based upon the computer analysis of the images of the other motorist's vehicle, the mobile device and/or insurance provider remote server may perform or provide various insurance services. For instance, certain fields of an online or virtual insurance claim submission form may be accurately pre-populated or otherwise adjusted based upon the data extracted from the images of the other motorist's vehicle.

In some embodiments, the online or virtual insurance claim functionality supported by the customer's mobile device may allow the customer to navigate to sections or pages associated with adding "Others Involved" and/or "Vehicle Involved" (with the accident) information to the virtual insurance claim. Those sections or pages may prompt the user to take an image of the other motorist's vehicle using their mobile device. After which, the mobile device may perform computer analysis on the image taken and then pre-populate certain fields of the insurance claim, such as make, model, license plate, and/or year or age of the other motorist's vehicle. Once the insurance customer has reviewed the information and is otherwise satisfied with the virtual insurance claim, the insurance customer may submit the virtual insurance claim via wireless communication from their mobile device to an insurance provider remote server or processor to facilitate the insurance provider promptly handling the insurance claim.

Exemplary Functionality

In one aspect, the present embodiments may provide functionality via a mobile device application that enables users or insurance customers to photographically capture make and model data of a vehicle and populate claim-form fields. An insurance provider may provide customers with the opportunity to submit an auto insurance claim via a mobile device. Using object-recognition technology associated with the mobile device application or insurance provider remote server, the functionality may enhance the recording of, and/or accuracy of, important insurance claim information. Insurance customers may capture images of vehicles to process and populate vehicle make and model data automatically into claim-form fields.

The functionality provided by the mobile device application may include a number of features, including the ability for customers to submit an insurance claim from anywhere. The mobile device application may use customer information to simplify the auto claims process and automatically select policy information.

Additional features may include the ability to view policies on a summary screen, including policy name, type and renewal date; deposit checks; record accident details, capture photos and submit information; view insurance or financial provider accounts with balances; pay bills; search for a hotel, gas station, tow truck, taxi, locksmith or rental car by location or zip code; locate selected vehicle repair facilities; and/or search for and contact an insurance agent or representative. The insurer may also offer other mobile applications, including telematics and usage-based insurance applications.

In one embodiment, the object recognition technology may allow customers to go to the "Others Involved" (with the vehicle accident) page or section, and provide customers with the option to photograph the back of another person's vehicle. Once the customer takes the picture, the mobile device and/or remote server may be configured to automatically process the image data and return data from an outside service that populates vehicle make and model information into corresponding fields of the mobile device application.

In one aspect, image-based insurance claims may be provided. An auto insurance customer, when involved in an automobile accident, may use their mobile device to fill out a virtual insurance claim. The virtual insurance claim may present options for entering information related to the other motorist and/or their vehicle involved in the automobile accident. The virtual insurance claim may allow the customer to take a photograph of the other motorist's vehicle. The mobile device may perform computer analysis on the photograph to extract certain information about the other motorist's vehicle. The virtual insurance claim may have fields for entering information about the other motorist's vehicle, including vehicle make, model, license plate, and/or year. The mobile device may automatically pre-populate one or more of the fields based upon the computer analysis of the photograph to facilitate the insurance customer completing the virtual insurance claim and wirelessly submitting the claim to the insurance provider.

Exemplary "Add Vehicle" Functionality

FIGS. 4 & 5 depict an exemplary "Add Vehicle" feature to a virtual insurance claim functionality that may be provided by the mobile device application (and/or mobile device). As shown by FIG. 4A, the initial page or screen presented by the mobile device application may be labeled "Others Involved," and may provide the user with the option of adding other vehicles and/or occupants of each vehicle involved with the vehicle collision. The user may also be provided with the option of adding information associated with one or more witnesses to the accident.

FIG. 4B depicts that the mobile device application may inform the user that they may complete the virtual insurance claim in part by using the mobile device camera. The mobile device camera may be used to fill in the other driver's information, such as driver's license, state identification, or vehicle make/model.

FIG. 5A depicts that the mobile device application may present a "Vehicle Involved" page or screen. The Vehicle Involved page may inform the user to take a photograph of the other motorist's vehicle, such as the rear or back of the vehicle, such that the mobile device or mobile device application may automatically fill in or complete certain fields within the virtual insurance claim. As shown, the mobile device application may automatically determine vehicle year, make, model, and/or license plate number of the other vehicle from computer analysis of the vehicle image(s).

FIG. 5B depicts an exemplary portrait view that may be displayed on the screen of the mobile device via the mobile device application. As shown, the mobile device application may instruct the user to take a photo of the back of the vehicle. The mobile device application may also allow the user the option of choosing which photo that they would like to use for the virtual insurance claim.

FIG. 5C depicts an exemplary updated "Other Vehicle" page of the mobile device application that is updated automatically based upon the computer analysis of the image of the vehicle. As shown, in one embodiment, the computer analysis may result in the other vehicle make and model fields automatically being determined and filled in by the mobile device or mobile device application. Additionally or alternatively, the other vehicle year and/or license plate may also be determined from the computer analysis of the vehicle image. The mobile device and/or mobile device application may provide additional, less, or alternate functionality, including that discussed elsewhere herein.

Exemplary Virtual Insurance Claim Generation

Figure 8:
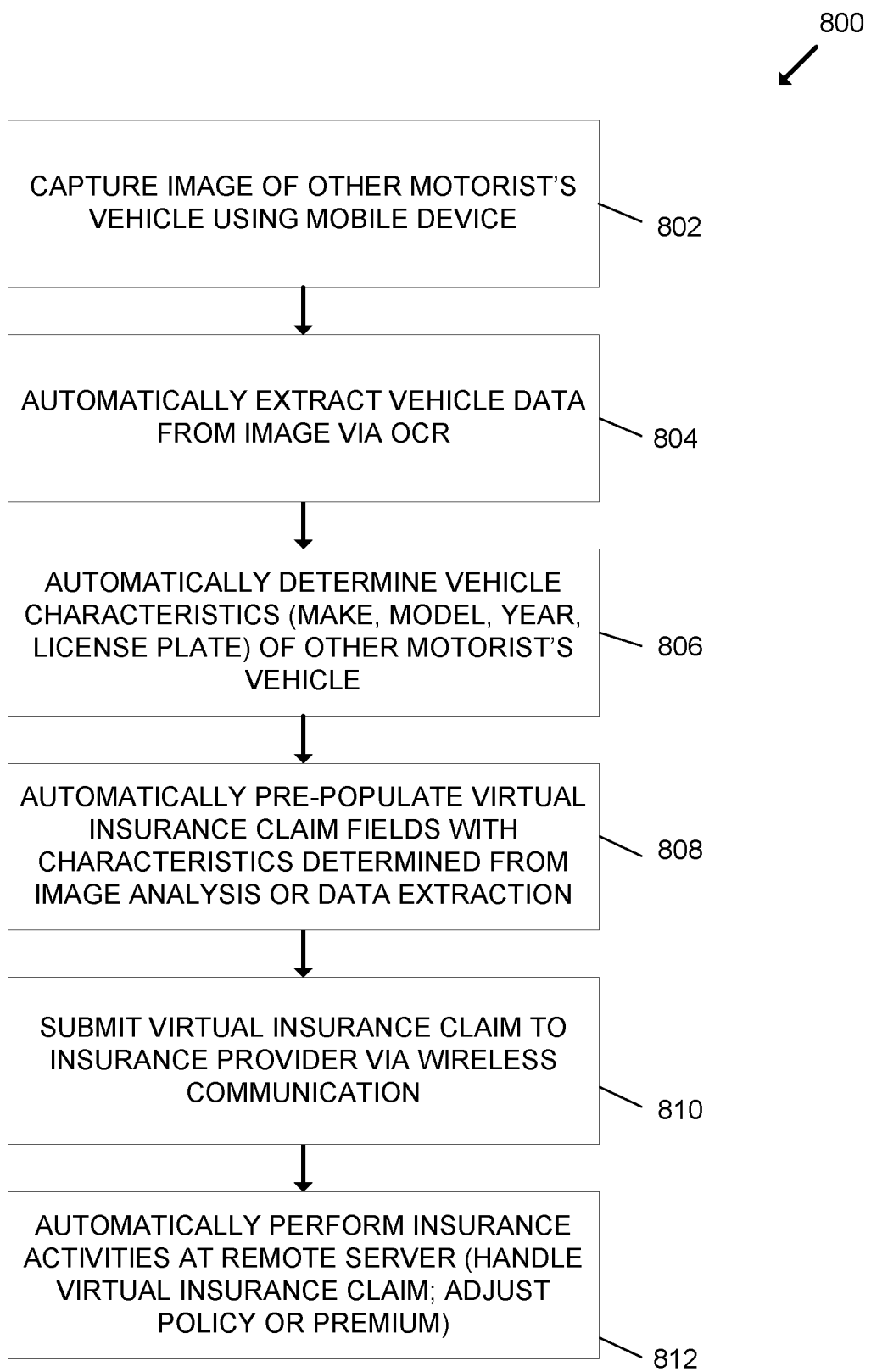
FIG. 8 illustrates an exemplary computer-implemented method 800 of pre-populating an online or virtual auto insurance claim using an image of a vehicle of a motorist other than the insured that was involved in an automobile accident with the insured and/or insured vehicle.

FIG. 8 illustrates an exemplary computer-implemented method of pre-populating an online or virtual auto insurance claim using an image of a vehicle owned by a motorist other than the insured and that was involved in an automobile accident with the insured and/or insured vehicle. In the present aspect, method 800 may be implemented by any suitable computing device (e.g., mobile computing device 106 or external computing device 114, as shown in FIG. 1). In one aspect, method 800 may be performed by one or more processors, applications, and/or routines, such as any suitable portion of controller 240, software applications 244, and/or software routines 252, for example, as shown in FIG. 2.

The method 800 may include capturing an image of another motorist's vehicle using a mobile device (block 802); automatically extracting vehicle data from the image (block 804); automatically determining vehicle characteristics from the image analysis or vehicle data extracted (block 806); automatically completing part of a virtual insurance claim using the vehicle characteristics determined (block 808); submitting the virtual insurance claim to the insurance provider (block 810); and/or performing insurance-related activities at the insurance provider location (block 812).

The method 800 may include capturing an image of another motorist's vehicle using a mobile device (block 802). After an insured is in a vehicle accident with another motorist, the insured may begin filling out a virtual insurance claim using their mobile device. The mobile device or an application associated with the virtual insurance claim may prompt the insured to take an image of the other motorist's vehicle, as shown in FIG. 5A (portion 505) and FIG. 5B, for example.

The method 800 may include automatically extracting vehicle data from the image (block 804). The image of the other motorist's vehicle may be analyzed using object recognition or OCR techniques—at either the mobile device or at a remote server of the insurance provider (i.e., the mobile device may transmit the image taken to the remote server for remote computer analysis of the image). Preferably, for efficiency, the computer analysis of the image may be performed locally at the mobile device or by a mobile device application. The computer analysis techniques may extract certain vehicle data from the image, such as character, name, number, license plate, color, make, or model information.

The method 800 may include automatically determining vehicle characteristics from the image analysis or vehicle data extracted (block 806). The mobile device or mobile device application (or even the insurance provider remote server) may align the vehicle data extracted with known data points to determine certain vehicle characteristics of the other motorist's vehicle, such as vehicle make, model, year, or license plate. For example, the vehicle data extracted and/or image data may be compared with known characteristics stored in a memory or table.

The method 800 may include automatically completing part of a virtual insurance claim using the vehicle characteristics determined (block 808). The mobile device or mobile device application (or even the insurance provider remote server) may use the vehicle characteristics of the other motorist's vehicle determined to select or pre-populate certain fields of a virtual insurance claim, such as fields related to vehicle make, model, year, or license plate of the other motorist's vehicle, as shown in FIG. 5C, for example.

The method 800 may include submitting the virtual insurance claim to the insurance provider (block 810). The mobile device or mobile device application may direct the submission of the completed virtual insurance claim from the mobile device to the insurance provider remote server or processor via wireless communication.

The method 800 may include performing insurance-related activities at the insurance provider location (block 812). Once the insurance provider remote server or processor receives the virtual insurance claim submitted from an insured, the insurance provider remote server or processor may automatically begin to handle the virtual insurance claim to facilitate prompt payout of insurance claim monies to the insured and/or quick repair of a damaged insured vehicle owned by the insured.

The method may include additional, fewer, or alternate actions, including those discussed elsewhere herein, and/or may be implemented via a computer system, communication network, one or more processors (such as an insurance customer mobile device and/or a remote server associated with an insurance provider), and/or computer-executable instructions stored on non-transitory storage media or computer-readable medium.

Figure 9:
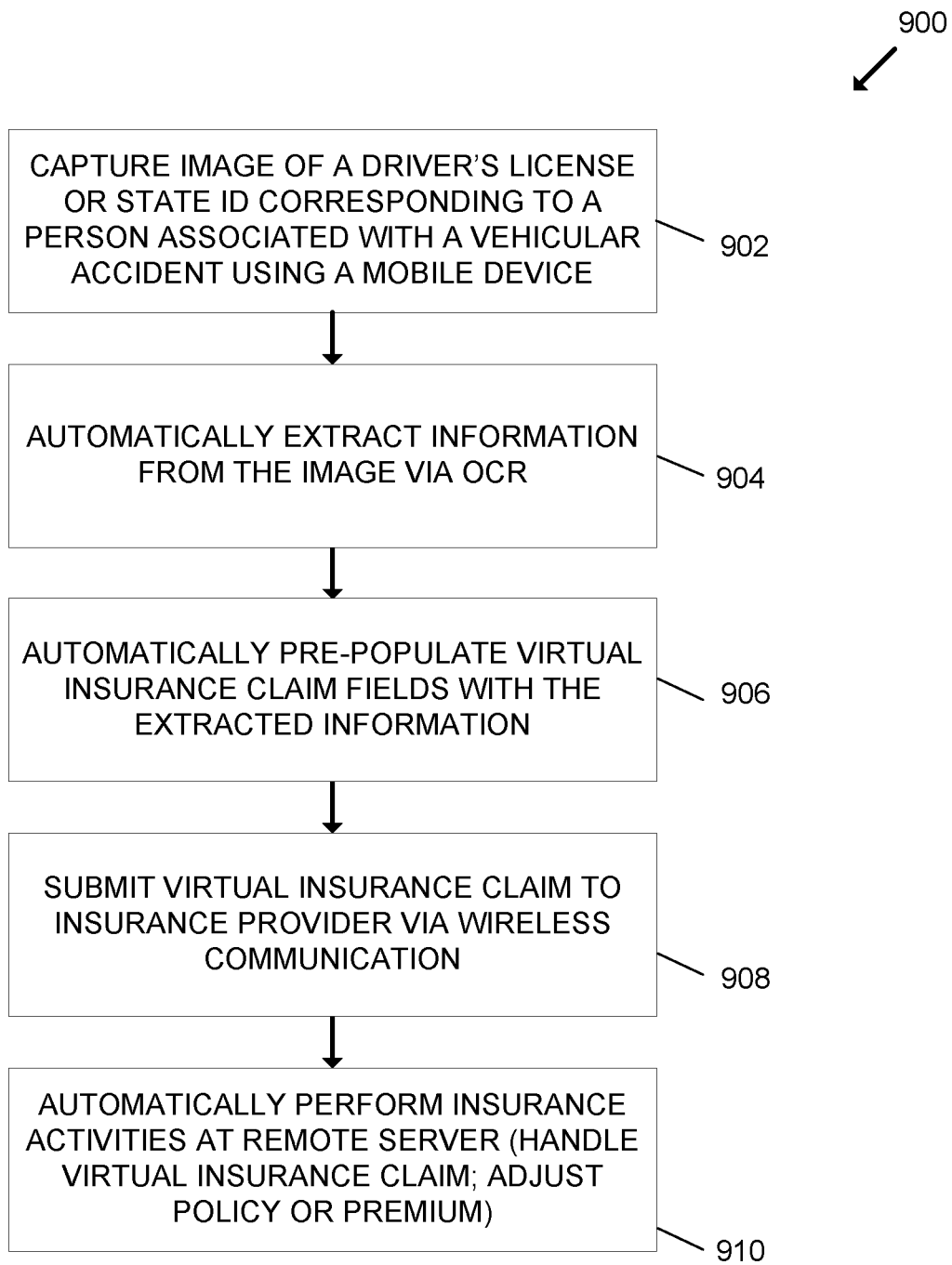
FIG. 9 illustrates an exemplary computer-implemented method 900 of pre-populating an online or virtual auto insurance claim using an image of a driver's license or state ID for a motorist involved in or associated with an automobile accident with the insured and/or insured vehicle.

FIG. 9 illustrates an exemplary computer-implemented method 900 of pre-populating an online or virtual auto insurance claim using an image of a driver's license or state ID for a motorist involved in or associated with an automobile accident with the insured and/or insured vehicle. In the present aspect, method 900 may be implemented by any suitable computing device (e.g., mobile computing device 106 or external computing device 114, as shown in FIG. 1). In one aspect, method 900 may be performed by one or more processors, applications, and/or routines, such as any suitable portion of controller 240, software applications 244, and/or software routines 252, for example, as shown in FIG. 2.

The method 900 may include capturing an image of a driver's license or state ID corresponding to a person associated with a vehicular accident using a mobile device (block 902); automatically extracting information from the image (block 904); automatically pre-populating part of a virtual insurance claim form using the extracted information (block 906); submitting the virtual insurance claim to the insurance provider (block 908); and/or performing insurance-related activities at the insurance provider location (block 910).

The method 900 may include capturing an image of a driver's license or state ID corresponding to a person associated with a vehicular accident using a mobile device (block 902). After an insured is in a vehicle accident with another motorist, the insured may begin filling out a virtual insurance claim using their mobile device. The mobile device or an application associated with the virtual insurance claim may prompt the insured to take an image of the other motorist's vehicle, as shown in FIG. 6A, for example.

The method 900 may include automatically extracting information from the image (block 904). The image of the driver's license or state ID may corresponding to a witness, a passenger of a vehicle involved in a vehicular accident, a driver of a vehicle involved in a vehicular accident. The image may be analyzed using object recognition or OCR techniques at either the mobile device or at a remote server of the insurance provider (i.e., the mobile device may transmit the image taken to the remote server for remote computer analysis of the image) (block 904). Preferably, for efficiency, the computer analysis of the image may be performed locally at the mobile device or by a mobile device application. The computer analysis techniques may extract certain information from the image, such as a name, phone number, address, driver's license number, or other contact information.

The method 900 may include automatically completing part of a virtual insurance claim using the extracted information from the driver's license or state ID (block 906). The mobile device or mobile device application (or even the insurance provider remote server) may use the extracted information to select or pre-populate certain fields of a virtual insurance claim, such as fields related to a name, phone number, address, driver's license number, or other contact information, as shown in Figure D, for example.

The method 900 may include submitting the virtual insurance claim to the insurance provider (block 908). The mobile device or mobile device application may direct the submission of the completed virtual insurance claim from the mobile device to the insurance provider remote server or processor via wireless communication.

The method 900 may include performing insurance-related activities at the insurance provider location (block 910). Once the insurance provider remote server or processor receives the virtual insurance claim submitted from an insured, the insurance provider remote server or processor may automatically begin to handle the virtual insurance claim to facilitate prompt payout of insurance claim monies to the insured and/or quick repair of a damaged insured vehicle owned by the insured.

The method may include additional, fewer, or alternate actions, including those discussed elsewhere herein, and/or may be implemented via a computer system, communication network, one or more processors (such as an insurance customer mobile device and/or a remote server associated with an insurance provider), and/or computer-executable instructions stored on non-transitory storage media or computer-readable medium.

Exemplary Computer-Implemented Methods

In one aspect a computer-implemented method of completing a virtual insurance claim may be provided. The method may include (1) capturing or taking a vehicle image of a vehicle via a mobile device camera; (2) automatically extracting, via one or more processors, vehicle-related data from the vehicle image via object recognition and/or optical character recognition techniques; (3) automatically determining, via the one or more processors, (a) a vehicle make, and/or (b) a vehicle model from analysis of the (i) vehicle-related data extracted from the vehicle image, and/or (ii) vehicle image; and/or (4) automatically pre-populating, via the one or more processors, vehicle make and/or model fields of a virtual insurance claim to facilitate an insurance customer completing the virtual insurance claim and/or submitting the completed virtual insurance claim via wireless communication from the mobile device to an insurance provider remote server or processor for handling or processing of the insurance claim by the insurance provider. The method may include additional, fewer, or alternate actions, including those discussed elsewhere herein, and/or may be implemented via a computer system, communication network, one or more processors (such as an insurance customer mobile device and/or a remote server associated with an insurance provider), and/or computer-executable instructions stored on non-transitory storage media or computer-readable medium.

For instance, automatically extracting, via the one or more processors, vehicle-related data from the vehicle image via object recognition and/or optical character recognition techniques may be performed by (a) the mobile device, and/or (b) a remote server or remote processor associated with the insurance provider. Automatically determining, via the one or more processors, the vehicle make, and/or the vehicle model from analysis of the (i) vehicle-related data extracted from the vehicle image, and/or (ii) vehicle image may be performed by (a) the mobile device, and/or (b) a remote server or remote processor associated with the insurance provider. The vehicle image captured by the mobile device camera for computer analysis (such as object recognition and/or optical character recognition) may be a picture or digital image of a rear, trunk, trunk area, or rear portion of the vehicle.

The method may also include automatically determining, via the one or more processors, (1) a vehicle license plate number, and/or (2) a vehicle year from analysis of the (i) vehicle-related data extracted from the vehicle image, and/or (ii) vehicle image. The vehicle may be a vehicle other than an insured vehicle of the insurance customer, the vehicle and the insured vehicle both being involved in an insured or insurance-related event, such as a vehicle collision or accident.

The method may include adjusting an insurance policy of the insurance customer based upon the completed virtual insurance claim submitted via wireless communication. The method may further include receiving, at or via the mobile device of the insurance customer, an indication of a receipt of the insurance claim by the insurance provider.

In another aspect, a computer-implemented method of handling an insurance claim may be provided. The method may include (1) receiving or collecting, via or at a remote server or processor associated with an insurance provider, a virtual insurance claim form that has been pre-populated (by a mobile device of an insurance customer) with other vehicle make and model information obtained via object recognition and/or optical character recognition techniques performed upon one or more digital images of the other vehicle captured or taken by the mobile device of the insurance customer, the insurance customer having an insured vehicle that is insured by the insurance provider, and the insured vehicle and other vehicle both being involved in an insurance-related event, such as a vehicle accident or collision; and/or (2) handling or processing, via or at the remote server or processor, all or a portion of the insurance claim for the insurance customer based upon the virtual insurance claim form that has been pre-populated with the other vehicle make and model information of the other vehicle involved in the insurance-related event such that delays associated with resolving the insurance claim are alleviated. The virtual insurance claim form further may have been pre-populated with other vehicle license plate and/or age information obtained or determined via object recognition and/or optical character recognition techniques performed upon the one or more digital images of the other vehicle captured or taken by the mobile device of the insurance customer. The vehicle image captured by the mobile device camera for computer analysis (such as object recognition and/or optical character recognition) may be a picture or digital image of a rear, trunk, or rear portion of the other vehicle. The method may include additional, fewer, or alternate actions, including those discussed elsewhere herein, and/or may be implemented via a computer system, communication network, one or more processors (such as an insurance customer mobile device and/or a remote server associated with an insurance provider), and/or computer-executable instructions stored on non-transitory storage media or computer-readable medium.

In another aspect, a computer-implemented method of completing a virtual insurance claim may be provided. The method may include (1) capturing or taking a vehicle image of a other vehicle via a mobile device camera mounted on a mobile device, the mobile device associated with an insured that owns an insured vehicle covered by an insurance policy issued by an insurance policy, the insured vehicle and the other vehicle both being involved in a vehicle accident or other insurance-related event; (2) automatically extracting, via or at the mobile device, vehicle-related data from the vehicle image via object recognition and/or optical character recognition techniques; (3) automatically determining, via or at the mobile device, (1) a vehicle make, and/or (2) a vehicle model of the other vehicle from analysis of the (i) vehicle-related data extracted from the vehicle image, and/or (ii) vehicle image; (4) automatically pre-populating, via or at the mobile device, vehicle make and/or model fields for the other vehicle within a virtual insurance claim form for insurance customer review, modification, and/or approval; (5) receiving, via or at the mobile device, an indication that the insurance customer has approved the pre-populated vehicle make and/or model fields for the other vehicle within the virtual insurance claim form; and/or (6) wirelessly transmitting, via or from the mobile device, a completed virtual insurance claim form that includes the pre-populated vehicle make and/or model fields for the other vehicle determined from computer analysis (i.e., object recognition and/or optical character recognition) of the vehicle image to a remote server or processor associated with an insurance provider to facilitate handling or processing of the insurance claim (involving the insured vehicle and/or the other vehicle) by the insurance provider. The method may include additional, fewer, or alternate actions, including those discussed elsewhere herein, and/or may be implemented via a computer system, communication network, one or more processors (such as an insurance customer mobile device and/or a remote server associated with an insurance provider), and/or computer-executable instructions stored on non-transitory storage media or computer-readable medium.

For instance, the vehicle image of the other vehicle captured or taken via the mobile device camera mounted on the mobile device may be a picture of a rear, a side, or a front, of the other vehicle. The method may further include automatically determining, via or at the mobile device, (1) a vehicle license, and/or (2) a vehicle year from analysis of the (i) vehicle-related data extracted from the vehicle image, and/or (ii) vehicle image. The vehicle image captured by the mobile device camera for computer analysis (such as object recognition and/or optical character recognition) may be a picture or digital image of a rear, trunk, or rear portion of the vehicle.

Exemplary User Interface

In one aspect, a graphical user interface for accepting a virtual auto insurance claim may be provided. The graphical user interface may include: (1) a vehicle make field of a virtual auto insurance claim for accepting a vehicle make for an accident vehicle involved in a vehicle accident, the accident vehicle being a vehicle other than an insured vehicle that is covered by an insurance policy issued by an insurance provider; and/or (2) a vehicle model field of the virtual auto insurance claim for accepting a vehicle model for the accident vehicle involved in the vehicle accident. The graphical user interface may automatically pre-populate the vehicle make field and/or the vehicle model field for the accident vehicle involved in the vehicle accident involving the insured vehicle based upon computer analysis of one or more images or pictures taken from a mobile device of the insured owning the insured vehicle and that show the accident vehicle other than an insured vehicle involved in the accident to facilitate the insured submitting the virtual auto insurance claim to the insurance provider for handling.

The graphical user interface may further be configured to pre-populate an age of vehicle field and/or a license plate number field of the accident vehicle based upon computer analysis of the one or more images or pictures taken from the mobile device of the accident vehicle. The computer analysis may involve object recognition and/or optical character recognition used on the one or more images or pictures of the accident vehicle. The one or more images or pictures showing the accident vehicle show a rear, trunk area, or rear portion of the accident vehicle, or alternatively, a side or front of the accident vehicle. The graphical user interface may include additional, less, or alternate functionality, including that discussed elsewhere herein.

Exemplary Mobile Device

In one aspect, a mobile device configured to submit an auto insurance claim may be provided. The mobile device may be configured to (1) accept an image of a vehicle involved in a vehicle accident other than an insured vehicle, the vehicle accident involving the vehicle and the insured vehicle, the insured vehicle owned by an insured and covered by an insurance policy issued by an insurance provider; (2) analyze the image of the vehicle involved in the vehicle accident to determine the vehicle make and/or vehicle model of the vehicle involved in the vehicle accident other than the insured vehicle; (3) pre-populate a virtual insurance claim for the insured owning the insured vehicle based upon analysis of the image of the vehicle involved in the vehicle accident; and/or (4) submitting, sending, or transmitting the virtual insurance claim to an insurance provider remote server or processor via wireless communication. The pre-populating the virtual insurance claim may include pre-populating one or more fields of the virtual insurance claim, the one or more fields including a vehicle make of the vehicle involved in the accident and/or a vehicle model of the vehicle involved in the accident to facilitate handling or addressing the virtual insurance claim submitted from the mobile device of the insured to the insurance provider. The one or more fields may also include a license plate and year of the vehicle. The mobile device may include additional, less, or alternate functionality, including that discussed elsewhere herein.

The mobile devices may be smart phones, cell phones, lap tops, tablets, phablets, PDAs (Personal Digital Assistants), computers, smart watches, pagers, hand-held mobile or portable computing devices, smart glasses, smart electronic devices, wearable devices, smart contact lenses, other computing devices, and/or other devices capable of wireless RF (Radio Frequency) communications; and/or other devices or systems that capture image, audio, or other data and/or are configured for wired or wireless communication.

The mobile devices may have cameras or other means of capturing image data. The mobile devices may also have receivers, transmitters, or transceivers for wireless communication and/or internet access. The mobile devices may also be configured with known functionality commonly possessed by mobile devices.

The image data generated may be transmitted, via wired or wireless communication, from a mobile device to a remote server, such as a remote server and/or other processor(s) associated with an insurance provider. The remote server and/or associated processors may build a database of the image and/or other data, and/or otherwise store or analyze the data collected.

Exemplary Remote Server

The insurance provider remote server and/or associated processors may analyze the data collected and then perform certain actions and/or issue tailored communications based upon the data, including the insurance-related actions or communications discussed elsewhere herein. The automatic gathering and collecting of data at the insurance provider, such as via wired or wireless communication, may lead to expedited insurance-related activity, including the automatic identification of insured events, and/or the automatic or semi-automatic processing or adjusting of insurance claims.

Image and/or other data may be gathered from customers, such as at or via a customer mobile device (e.g., smart phones, smart glasses, smart watches, smart wearable devices, smart contact lenses, smart cameras, and/or other devices capable of wireless communication). The image and/or other data may be wirelessly transmitted to a remote server (or other processor) associated with an insurance provider. Object recognition and/or optical character recognition may be performed on the customer images received at the insurance provider remote server. Based upon the computer analysis of the customer images, the insurance provider remote server may perform or provide various insurance services.

For instance, insurance claims, policies, premiums, rates, discounts, rebates, rewards, and/or programs may then be adjusted based upon the data extracted from the customer images collected. In some embodiments, the data extracted from the customer images remotely taken may be used to facilitate the customer filing an insurance claim for an insurance policy issued by the insurance provider.

Exemplary Computing Device

An exemplary computing or mobile device that may implement some or all of the functionality, algorithm, routines, techniques, etc. discussed above may be transparently orchestrate collaborative execution of a single data-parallel kernel across multiple asymmetric CPUs and GPUs. The computing or mobile device may include one or more central processing units (CPUs) and one or more graphics processing units (GPUs) or, generally, processing units (may be called processors, microcontrollers or microprocessors), non-transitory memories, and a system bus that couples various system components including the system memory to the processing units. The system bus may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

The exemplary computing or mobile device may include an assortment of computer-readable media. Computer-readable media may be any media that may be accessed by the computing device. By way of example, and not limitation, the media may include both volatile and nonvolatile media, removable and non-removable media. Media may also include computer storage media and communication media. Computer storage media may include volatile and nonvolatile, removable and non-removable media that stores information such as computer-readable instructions, program modules, data structures, or other data. Computer-storage media may include RAM, ROM, EEPROM, or other memory technology, optical storage disks, magnetic storage devices, and any other medium which may be used to store computer-accessible information. Communication media may be computer-readable instructions, data structures, program modules, or other data in a modulated data signal or other transport mechanism. Communication media may include wired media such as a wired network or direct-wired connection, and wireless media such as RF, infrared, and other wireless media.

The non-transitory memory or memories may include storage media in the form of volatile and/or non-volatile memory such as ROM and RAM. In an embodiment, the ROM and/or RAM may store instructions that are executable by the processing unit. For example, a basic input/output system (BIOS), containing algorithms to transfer information between components within the computer or mobile device, may be stored in ROM. Data or program modules that are immediately accessible or are presently in use by the processing unit may be stored in RAM. Data normally stored in RAM while the computing or mobile device is in operation may include an operating system, application programs, program modules, and program data. In particular, the RAM may store one or more applications including one or more routines implementing the functionality of the applications, for example.

The memories and/or other memories may also implement one or more buffers utilized by GPUs of the processors. The memories and/or other memories of the computer or mobile device may store one or more programs executable by GPUs included in the processors.

The computing or mobile device may also include other storage media such as a hard disk drive that may read from or write to non-removable, non-volatile magnetic media, a magnetic disk drive that reads from or writes to a removable, non-volatile magnetic disk, and an optical disk drive that reads from or writes to a removable, nonvolatile optical disk. Other storage media that may be used includes magnetic tape cassettes, flash memory cards, digital versatile disks, digital video tape, solid state RAM, and solid state ROM. The hard disk drive may be connected to the system bus through a non-removable memory interface such as interface. A magnetic disk drive and optical disk drive may be connected to the system bus by a removable memory interface, such as interface.

A user may interact with the computing device through input devices such as a keyboard or a pointing device (i.e., a mouse). A user input interface may be coupled to the system bus to allow the input devices to communicate with the processing unit. A display device such as a monitor may also be connected to the system bus via a video interface (not shown).

The processing performed by the computing or mobile device may be distributed among a plurality of computing devices in an arrangement known as "cloud computing," in an embodiment. This configuration may provide several advantages, such as, for example, enabling near real-time uploads and downloads of information as well as periodic uploads and downloads of information.

ADDITIONAL CONSIDERATIONS

In some aspects, the external computing device may determine whether automated data capture from a driver's license image is acceptable in accordance with state law. This determination may be made, for example, based upon one or more user selections that are sent by the mobile computing device and received by the external computing device.

For example, upon receiving an indication of the issuing state for an occupant and/or witness driver's license, CPU 306 may execute instructions stored in claim submission validation module 317 to determine whether an image of the driver's license may be used for purposes of automated data capture in accordance with the issuing state's laws. External computing device 300 may then provide feedback to a user (e.g., as a notification generated upon execution of instructions stored in notification generator module 316) regarding whether to capture the image (if allowed by the laws of the issuing state) or that the image may not be captured (if not allowed by the laws of the issuing state).

The following aspects have been described in the context of one or more insured persons automatically populating insurance forms for one or more auto insurance policies. However, these aspects may also include any suitable type of policy for which images may be utilized to automatically populate insurance forms used to submit an insurance claim. For example, the aspects as described herein may apply to fleets of automobiles, agency car pools, homeowners' insurance claims, motorcycle insurance claims, etc.

Furthermore, although the following text sets forth a detailed description of numerous different embodiments, it should be understood that the legal scope of the description is defined by the words of the claims set forth at the end of this patent and equivalents. The detailed description is to be construed as exemplary only and does not describe every possible embodiment since describing every possible embodiment would be impractical. Numerous alternative embodiments may be implemented, using either current technology or technology developed after the filing date of this patent, which would still fall within the scope of the claims.

The following additional considerations apply to the foregoing discussion. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (e.g., code embodied on a machine-readable medium or in a transmission signal) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

This detailed description is to be construed as exemplary only and does not describe every possible embodiment, as describing every possible embodiment would be impractical, if not impossible. One may be implement numerous alternate embodiments, using either current technology or technology developed after the filing date of this application.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein. It is therefore intended that the foregoing detailed description be regarded as illustrative rather than limiting, and that it be understood that it is the following claims, including all equivalents, that are intended to define the spirit and scope of this invention.

The patent claims at the end of this patent application are not intended to be construed under 35 U.S.C. § 112(f) unless traditional means-plus-function language is expressly recited, such as "means for" or "step for" language being explicitly recited in the claim(s).

What is claimed is:

1. A computer-implemented method for filing an insurance claim, the method comprising:
    receiving, by one or more processors, an input via a mobile computing device indicating an insurance claim submission corresponding to a vehicular accident, the input including a request to extract image data for population in an insurance claim form;
    capturing, by one or more processors, one or more images associated with the vehicular accident;
    generating, by one or more processors, application data to identify image content for each of the one or more images, wherein the application data is indicative of one or more of (i) an insurance policy holder, or (ii) environmental data associated with the vehicular accident;
    embedding, by one or more processors, the application data into each of the one or more images;
    determining, by one or more processors, a data extraction process to execute based upon the application data;
    identifying, by one or more processors, one or more alphanumeric characters in accordance with the data extraction process performed on the one or more images; and
    populating, by one or more processors, one or more fields of the insurance claim form with populated data based upon the one or more alphanumeric characters.

2. The computer-implemented method of claim 1, further comprising:
    transmitting, by one or more processors, the insurance claim form including the populated data to an external computing device;
    wherein the insurance claim form is received by the external computing device and utilized to facilitate filing of the insurance claim submission corresponding to the vehicular accident; and
    receiving, by one or more processors, a notification from the external computing device that an insurance claim has been successfully opened based upon the transmitted insurance claim form.

3. The method of claim 1, wherein the content included within the one or more images associated with the vehicular accident include one or more of:
    a rear section of a vehicle involved in the vehicular accident;
    a driver's license of a driver of one or more vehicles involved in the vehicular accident;
    a driver's license of a one or more vehicle passengers involved in the vehicular accident; and
    a driver's license of a witness of the vehicular accident.

4. The method of claim 1, further comprising:
    receiving the insurance claim form from an external computing device; and
    displaying the received insurance claim form via the mobile computing device.

5. The method of claim 1, further comprising:
    transmitting, by one or more processors, the insurance claim form including the populated data to an external computing device; and
    displaying, by one or more processors, an indication that the insurance claim form was accepted from the external computing device.

6. The method of claim 1, wherein the input further includes an issuing state corresponding to a driver's license of a vehicle occupant involved in the vehicular accident, the one or more images includes an image of the driver's license, and the issuing state corresponding to the driver's license is utilized to identify locations within the image of the driver's license where the data extraction process is performed to identify the one or more alphanumeric characters.

7. The computer-implemented method of claim 6, further comprising:
    transmitting, by one or more processors, the issuing state corresponding to the driver's license.

8. A non-transitory, tangible computer-readable medium storing machine readable instructions in mobile computing device, that when executed by a processor, causes the processor to:
- receive an input via a mobile computing device indicating an insurance claim submission corresponding to a vehicular accident, the input including a request to extract image data for population in an insurance claim form;
- capture one or more images associated with the vehicular accident;
- generate application data to identify image content for each of the one or more images, wherein the application data is indicative of one or more of (i) an insurance policy holder, or (ii) environmental data associated with the vehicular accident;
- embed the application data into each of the one or more images;
- determine a data extraction process to execute based upon the application data;
- identify the image data including one or more alphanumeric characters that have been identified in accordance with the data extraction process performed on the one or more images, the type of data extraction process being executed based upon the application data; and
- populate one or more fields of the insurance claim form with populated data based upon the one or more alphanumeric characters.

9. The non-transitory, tangible computer-readable medium of claim 8, further including instructions, that when executed by a processor, causes the processor to:
- transmit the insurance claim form including the populated data to an external computing device, wherein the insurance claim form is received by the external computing device and utilized to facilitate filing of the insurance claim associated with the vehicular accident; and
- receive a notification from the external computing device that an insurance claim has been successfully opened based upon the transmitted insurance claim form.

10. The non-transitory, tangible computer-readable medium of claim 8, wherein the content included within the one or more images associated with the vehicular accident include one or more of:
- a rear section of a vehicle involved in the vehicular accident;
- a driver's license of a driver of one or more vehicles involved in the vehicular accident;
- a driver's license of a one or more vehicle passengers involved in the vehicular accident; and
- a driver's license of a witness of the vehicular accident.

11. The non-transitory, tangible computer-readable medium of claim 8, further including instructions, that when executed by a processor, causes the processor to:
- receive the insurance claim form from an external computing device; and
- display the received insurance claim form via the mobile computing device.

12. The non-transitory, tangible computer-readable medium of claim 8, further including instructions, that when executed by a processor, causes the processor to:
- transmit the insurance claim form including the populated data to an external computing device; and
- display an indication that the insurance claim form was accepted from the external computing device.

13. The non-transitory, tangible computer-readable medium of claim 8, wherein the input further includes an issuing state corresponding to a driver's license of a vehicle occupant involved in the vehicular accident, the one or more images includes an image of the driver's license, and the issuing state corresponding to the driver's license is utilized to identify locations within the image of the driver's license where the data extraction process is performed to identify the one or more alphanumeric characters.

14. The non-transitory, tangible computer-readable medium of claim 13 further including instructions, that when executed by a processor, causes the processor to:
- transmit the issuing state corresponding to the driver's license.

15. A mobile computing device, comprising:
- a communication unit configured to receive an input indicating an insurance claim submission corresponding to a vehicular accident, the input including a request to extract image data for population in an insurance claim form;
- an image capture device configured to capture one or more images associated with the vehicular accident; and
- a processor configured to:
    - generate application data to identify image content for each of the one or more images, wherein the application data is indicative of one or more of (i) an insurance policy holder, or (ii) environmental data associated with the vehicular accident,
    - embed the application data into each of the one or more images,
    - determine a data extraction process to execute based upon the application data,
    - identify one or more alphanumeric characters in accordance with the data extraction process performed on the one or more images, and
    - populate one or more fields of the insurance claim form with populated data based upon the one or more alphanumeric characters.

16. The mobile computing device of claim 15, wherein the communication unit is further configured to:
- transmit the insurance claim form including the populated data to an external computing device, wherein the insurance claim form is received by the external computing device and utilized to facilitate filing of the insurance claim associated with the vehicular accident; and
- receive a notification from the external computing device that an insurance claim has been successfully opened based upon the transmitted insurance claim form.

17. The mobile computing device of claim 15, wherein the content included within the one or more images associated with the vehicular accident include one or more of:
- a rear section of a vehicle involved in the vehicular accident;
- a driver's license of a driver of one or more vehicles involved in the vehicular accident;
- a driver's license of a one or more vehicle passengers involved in the vehicular accident; and
- a driver's license of a witness of the vehicular accident.

18. The mobile computing device of claim 15, wherein the communication unit is further configured to receive the insurance claim form from an external computing device, and the mobile computing device further comprises:
- a display configured to display an insurance claim form via the mobile computing device corresponding to the insurance claim, wherein the display is further configured to display the received insurance claim form via the mobile computing device.

19. The mobile computing device of claim 15, wherein the input further includes an issuing state corresponding to a driver's license of a vehicle occupant involved in the vehicular accident, the one or more images includes an image of the driver's license, and the issuing state corresponding to the driver's license is utilized to identify locations within the image of the driver's license where the data extraction process is performed to identify the one or more alphanumeric characters.

20. The mobile computing device of claim 19, wherein:
the communication unit is further configured to transmit the issuing state corresponding to the driver's license to the external computing device.

\* \* \* \* \*